US010066422B2

(12) United States Patent
Yang

(10) Patent No.: US 10,066,422 B2
(45) Date of Patent: Sep. 4, 2018

(54) EAS DEVICE WITH WRAPPING SPLITTER FOR OBJECTS WITH WRAPPING

(71) Applicant: Xiao Hui Yang, Saratoga, CA (US)

(72) Inventor: Xiao Hui Yang, Saratoga, CA (US)

( * ) Notice: Subject to any disclaimer, the term of this patent is extended or adjusted under 35 U.S.C. 154(b) by 0 days.

(21) Appl. No.: 15/822,534

(22) Filed: Nov. 27, 2017

(65) Prior Publication Data

US 2018/0163435 A1 Jun. 14, 2018

Related U.S. Application Data

(63) Continuation-in-part of application No. 15/375,247, filed on Dec. 12, 2016, now Pat. No. 9,830,792.

(51) Int. Cl.
| | |
|---|---|
| *G08B 13/14* | (2006.01) |
| *E05B 73/00* | (2006.01) |
| *G08B 13/24* | (2006.01) |
| *G06K 7/10* | (2006.01) |
| *G08B 25/00* | (2006.01) |

(52) U.S. Cl.
CPC ...... *E05B 73/0029* (2013.01); *E05B 73/0058* (2013.01); *G06K 7/10188* (2013.01); *G08B 13/1463* (2013.01); *G08B 13/2417* (2013.01); *G08B 13/2434* (2013.01); *G08B 13/2448* (2013.01); *B65D 2211/00* (2013.01); *G08B 25/008* (2013.01)

(58) Field of Classification Search
CPC ............ G08B 13/2402; G08B 13/2434; G08B 13/2428; G08B 13/1463; G08B 13/02; E05B 73/0017
See application file for complete search history.

(56) References Cited

U.S. PATENT DOCUMENTS

| | | | | |
|---|---|---|---|---|
| 5,610,587 A * | 3/1997 | Fujiuchi | ................. | G08B 13/14 340/568.2 |
| 5,656,998 A * | 8/1997 | Fujiuchi | ............. | G08B 13/1454 340/568.1 |
| 5,844,484 A * | 12/1998 | Fujiuchi | ................... | G08B 7/06 340/572.1 |
| 6,339,377 B1 * | 1/2002 | Naka | ........................ | G08B 3/10 340/572.1 |
| 6,822,569 B1 * | 11/2004 | Bellum | .............. | G08B 13/2402 235/449 |

(Continued)

*Primary Examiner* — Joseph Feild
*Assistant Examiner* — Rufus Point
(74) *Attorney, Agent, or Firm* — Brian W. Foxworthy; Robert R. Waters; Waters Law Group, PLLC

(57) ABSTRACT

An electronic article surveillance device with an electronics housing and base attaches to an article to be protected. The housing and base have connecting interfaces which act together to attach the housing to the base. The housing and base have matching apertures. A switch and a wrapping splitter extend from the housing through the apertures. The switch detects when the device is attached to an object and the wrapping splitter splits the wrapping to prevent the wrapping from being used to defeat the switch. Electronics monitor the status of the switch. The apparatus may employ a restraining mechanism to prevent the operation of the wrapping splitter unless the housing is attached to the base. The housing and base may be attached to each other by a manually movable latch, which may also actuate the wrapping splitter. Electronics in the apparatus receive and send signals.

21 Claims, 21 Drawing Sheets

(56) References Cited

U.S. PATENT DOCUMENTS

| | | | |
|---|---|---|---|
| 7,671,741 B2 | 3/2010 | Lax et al. | |
| 7,961,100 B2* | 6/2011 | Wyatt, Jr. | E05B 73/0017 235/375 |
| 8,274,391 B2* | 9/2012 | Yang | G08B 13/1463 340/10.1 |
| 8,284,062 B2 | 10/2012 | Wyatt, Jr. et al. | |
| 8,305,219 B2* | 11/2012 | Yang | G08B 13/1463 340/10.1 |
| 8,334,776 B2* | 12/2012 | Yang | G08B 13/2434 340/10.1 |
| 8,368,536 B2* | 2/2013 | Fawcett | G08B 13/1463 340/568.1 |
| 8,368,542 B2* | 2/2013 | Yang | G08B 13/1463 340/10.1 |
| 8,368,543 B2* | 2/2013 | Yang | G08B 13/2434 340/10.1 |
| 8,373,564 B2 | 2/2013 | Wyatt, Jr. et al. | |
| 8,373,565 B2* | 2/2013 | Yang | G08B 13/2434 340/10.1 |
| 8,514,078 B2 | 8/2013 | Lax et al. | |
| 9,659,472 B2* | 5/2017 | Fawcett | G08B 13/14 |
| 2002/0024440 A1* | 2/2002 | Okuno | E05B 73/0017 340/572.1 |
| 2007/0146134 A1* | 6/2007 | Belden | G08B 13/1445 340/571 |
| 2009/0289798 A1* | 11/2009 | Yang | G08B 13/1463 340/572.8 |
| 2010/0171621 A1* | 7/2010 | Yang | G08B 13/1463 340/572.9 |
| 2010/0188227 A1* | 7/2010 | Yang | G08B 13/1463 340/572.1 |
| 2011/0115632 A1* | 5/2011 | Yang | G08B 13/1463 340/572.8 |
| 2011/0227706 A1* | 9/2011 | Yang | G08B 13/1463 340/10.1 |
| 2014/0077953 A1* | 3/2014 | Yang | G08B 13/126 340/572.1 |
| 2014/0253290 A1* | 9/2014 | Yang | G06K 7/10188 340/10.1 |
| 2014/0292515 A1* | 10/2014 | Fawcett | G08B 13/1445 340/572.1 |
| 2015/0302711 A1* | 10/2015 | Yang | E05B 73/0029 340/572.9 |

* cited by examiner

EAS DEVICE WITH WRAPPING SPLITTER FOR OBJECTS WITH WRAPPING

RELATED APPLICATIONS

This application is a continuation-in-part of U.S. patent application Ser. No. 15/375,247, filed Dec. 12, 2016. The entire disclosure contained in U.S. patent application Ser. No. 15/375,247, including any attachments thereto, are incorporated herein by reference.

FIELD OF THE INVENTION

The present application is generally related to an electronic article surveillance (EAS) device, and more specifically, an EAS device that attaches to a boxed object to be protected; the box having a wrapping on it.

BACKGROUND OF THE INVENTION

Theft is frequently a problem in retail stores as well as in other environments. In some environments, it is desirable to track objects. To address these issues, electronic article surveillance (EAS) systems are installed. Generally, in EAS systems, electronic tags, labels, or similarly titled electronic devices are placed on objects to be protected, or monitored. These EAS tags, or devices, are capable of generating a signal to reply back to the broader EAS system. The broader EAS system creates interrogation fields which stimulate the EAS tags to produce reply signals in response to the interrogation fields. These responding signals from the EAS tags, indicate that an EAS tag, and the object to which it is attached, are in an interrogation field.

These interrogation fields are frequently set up at exits or entries to an area that is being monitored or protected. Frequently, the antennas that are used to generate the interrogation fields and to monitor for tag signals are housed within pedestals that are placed to each side of an exit. However, these antennas and their controlling electronics can be positioned overhead or within the floor in the area close to the exit.

The controlling electronics for these antennas generate a signal which is transmitted by the antennas and creates the interrogation field. This field energizes or stimulates tags that are passing through the interrogation field, or zone. The tags then produce a signal in response to the interrogation field. This signal from the tags may be created by the energy of the field itself, or the tags may have on board power supplies and electronics that reply to the interrogation field. The interrogation field is cycled for periods of transmission and monitoring. The interrogation field initially cycles and broadcast out into the zone being monitored and then the interrogation field is stopped. The antennas of the EAS system then monitor for a tag signal. If a tag signal is detected, it is assumed that the tag is improperly in the zone being monitored by the interrogation field, and the EAS system determines that an alarm condition is in effect. The EAS system can then generate an alarm, either an optical alarm such as flashing lights, an audible alarm such as bells, etc., or a system alarm that is broadcast to operator stations.

EAS tags, or devices, are attached to objects by various methods. The method used depends on the type of object being protected and determines the shape of the EAS device. As one example, EAS tags for clothing frequently employ a tack to maintain the EAS tag on the article of clothing. Other applications use different methods which leads to EAS tags having different physical characteristics. For goods contained in a box, the EAS tag is attached to the box. Some EAS tags employ an adhesive to maintain the tag on the box and these may also employ a switch to monitor the continued attachment of the EAS tag on the box. If the box is enclosed in plastic wrapping, thieves may remove the EAS device from the box and maintain the wrapping on the adhesive, and thus defeat the switch.

RELEVANT ART

U.S. Pat. No. 8,368,542 by Yang is for an EAS tag using tape with a conductive element. In Yang '542, an electronic article surveillance apparatus for monitoring large objects is comprised of a base, at least one segment of tape, and an electronics housing. The segment of tape has a least one electrically conductive element running the length of the tape. The base rests on an object to be monitored, and the housing releasably latches onto the base, while each tape segment wraps around the object with each end of tape segment being fixed between the base and housing. Electronics within the housing complete a circuit through each tape segment and monitor the tape segments for electrical continuity. If electrical continuity is lost, either by cutting a tape segment, or unauthorized unlatching of the housing, an alarm can be sounded by the electronics within the housing. The electronic housing may be disarmed by a remote device and released from the base. Both base and tape segments may have adhesive elements.

U.S. Pat. No. 7,961,100 by Wyatt, Jr. et al is for a theft deterrent device. A theft deterrent device includes a carrier having a pivotally mounted pin and an alarm tag for receiving the pin to secure the carrier and alarm tag together when secured on an item of merchandise by an adhesive pad on the carrier. Spaced electrical contacts within the alarm tag receive the pin therebetween to provide an electrical path between the contacts to close a first electrical circuit which turns the device on. A flexibly mounted projection on the carrier depresses a plunger switch to arm the device. The security device is configured to sound an onboard alarm in response to prying of the carrier from the alarm tag or cutting of the pin of the carrier, or if an EAS tag receives a wireless signal from a security gate. The carrier can remain on the purchased merchandise for subsequent disposal.

U.S. Pat. No. 7,671,741 by Lax, et al. is for an "Anti-Theft Security Device and Perimeter Detection System." In Lax, a security tag includes a housing, a membrane operable for attachment to merchandise, wherein the housing is connected to the membrane, a monitoring device operable to monitor whether a party removes or attempts to remove the housing from the membrane and an alarm operable to emit a tamper signal when the monitoring device indicates that a party has removed or attempted to remove the housing from the membrane in an unauthorized condition. In Lax, an embodiment includes a security tag operable for connection to merchandise to be secured, a monitoring device operable to monitor whether a party removes or attempts to remove the security tag from the merchandise and an alarm operable to emit a tamper alarm signal when the monitoring device indicates that a party has removed or attempted to remove the security tag from the merchandise in an unauthorized condition.

As may be seen, there is a need for an EAS device that compensates for boxes that have a plastic wrapping that may be used to defeat the monitoring apparatus of the EAS device.

SUMMARY OF EMBODIMENTS OF THE INVENTION

The present invention is for an electronic article surveillance device having an electronics housing and a base. The base may be secured with adhesive directly to an object such as a box, and the electronics housing is maintained on the object by attaching to the base. The electronics housing has a switch that has it state changed when the EAS device is attached to the box. The switch can act as an arming switch when the EAS device is attached to the box, and it can continue to monitor for ongoing attachment of the EAS device to the box. Some switches may employ a spring biased plunger as the mechanical element that contacts and monitors attachment to an object.

The spring force generated by the switch is relatively weak. With boxes that have a plastic wrapping, the plastic wrapping may stick to the adhesive with enough force to maintain the mechanical element of the switch in a compressed state and prevent detecting that the EAS device has been removed by an unauthorized person. Alternatively, an unauthorized person may actively use the plastic wrapping to maintain the status of the switch, while they remove the EAS device from the box. The various embodiments of the EAS device of the present application address this issue.

In one embodiment, an aperture in the base is located in proximity to the switch when the housing is assembled on the base. A flexible tab on the base extends out into the aperture, and the flexible tab is aligned with the switch. The flexible tab is biased away from the housing and toward the box. When the base is placed on the box, the tab is pushed up into the aperture, and when the housing is mounted to the base and box, it is the flexible tab that the switch contacts. If the EAS device is removed from the article, the flexible tab is made with enough resilience that it overcomes the cling of the plastic wrap and can even stretch the plastic. This creates a void that allows the switch to extend and change state to indicate that the device has been removed and that an alarm condition exists.

In other embodiments of the EAS device, a piercing element precuts the plastic wrapping on the article. Depending on the specific embodiment, this precutting of the wrapping can serve different, but related purposes. In embodiments where the flexible tab remains on the base, precutting the plastic wrapping makes it easier for the flexible tab to push out the wrapping and allow a switch to extend. In embodiments where the precutting element is removed from the base after the wrapping is precut, the switch extends through the cut made in the plastic wrap to generate a signal.

In at least one embodiment, the flexible tab is biased to extend past the bottom surface of the base, and the tab provides the motion for the cutting action. The flexible tab has a piercing element, such as sharp point or edge, which is located to contact the plastic wrap. In at least one embodiment, the piercing element is a piercing protrusion extending from the bottom of the flexible tab. The piercing protrusion is sized and positioned on the flexible tab to contact the plastic wrap as the bottom surface of the base approaches the article. As the bottom surface of the base contacts the article, the flexible tab is pushed up into the aperture while the piercing protrusion is engaged with the plastic wrapping. As the tab is pushed back into the aperture of the base, the force and relative motion generated between the piercing protrusion on the tab and the article is sufficient to precut the wrap. With the wrap precut, if the EAS apparatus is removed from article to which it is attached, the flexible tab can more easily push out into the cut wrap and allow the switch to extend and change state. The change of state of the switch signals the electronics in the housing that an alarm condition exists.

In another embodiment, the piercing element is the end of the flexible tab. As with the previously discussed embodiments, the flexible tab is biased to extend past the bottom surface of the base, and the tab provides the motion for the cutting action The flexible tab is given a sufficiently sharp end to snag into the plastic wrap, and the flexible tab is shaped to induce the engagement of the sharp end into the plastic wrap as the base is attached to the article. As the flexible tab is pushed up into the aperture, the flexible tab precuts, or tears, the plastic wrap. With the wrap precut, if the EAS apparatus is removed from article to which it is attached, the flexible tab can more easily push out into the cut wrap and allow the switch to extend and change state. The change of state of the switch signals the electronics in the housing that an alarm condition exists.

Some embodiments of the EAS device employ a removable piercing element. In those embodiments a removable tab initially covers the aperture in the base that aligns with the switch in the housing. The removable tab bears a piercing tack. In some embodiments, the piercing tack is born in a slot in the removable tab. After the base is installed on an article having plastic wrap, the installer slides the piercing tack in the slot to pre-tear, or precut, a hole in the plastic wrap. The removable tab is then removed from the base and a tear in the plastic wrap is left within the aperture of the base to align with the switch of the housing. In some embodiments, the piercing tack is constrained in an aperture in the removable tab. In these embodiments, after the base is installed on an article having plastic wrap, the installer twists the piercing tack in the aperture to pre-tear, or precut, a hole in the plastic wrap. The removable tab is then removed from the base and a tear in the plastic wrap is left within the aperture of the base to align with the switch of the housing. In embodiments using a removable tab and tacks as piercing elements to tear the wrap, if the EAS device is removed by an unauthorized person, the switch will extend through the precut hole and change its state, generating a signal.

In still other embodiments, the EAS apparatus employs a wrapping splitter in the housing that is manually actuated to split the wrapping after the base and housing are placed on an object having a wrapping. In those embodiments, matching apertures in the bottom of the housing and in the base allow a wrapping splitter to extend from the housing, make contact with the object and its wrapping, and move while in contact with the object to split, or tear, the wrapping. A switch is positioned where the split is created, allowing the switch to operate without being compromised by the wrapping.

In some embodiments employing a wrapping splitter internal to the housing, the wrapping splitter may be actuated by the latch that is manually moved to latch the housing to the base. Various mechanical works may be employed to link the movement of the wrapping splitter to the latch. In at least one embodiment, the wrapping splitter may be pivotally mounted in the housing and a guide on the latch moves the wrapping splitter back and forth with the latch. As the wrapping splitter is moved, it extends through the apertures and contacts the object, splitting the wrapping. Other embodiments may employ a cam and follower configuration. In some of those embodiments, a cam follower carries the wrapping splitter, while the latch moves the cam follower with respect to a fixed cam. The fixed cam pushes the wrapping splitter outward to contact the object as the latch provides lateral movement to split the wrapping. In some embodiments the switch is also moved into the appropriate position by the movement of the latch.

In embodiments employing a manually actuated wrapping splitter, the wrapping splitter must have enough extension to reach through the base as well as the housing to contact the object and split the wrapping. If a housing is not installed on a base, the wrapping splitter may protrude significantly from the bottom of the housing and pose a safety issue, or just generally a hazard for snagging other items. To address this, some embodiments may have a mechanism to prevent movement of the wrapping splitter actuator. In cases where the latch is the actuator, the latch would be restrained as the safety measure. In some embodiments, when the latch is in the unlatched position, a pin on the latch inserts into an aperture in the bottom of the housing. This pin restrains the movement of the latch. The aperture passes through the bottom of the housing, and a release stub on the base matches the location of the aperture. When the housing is placed on the base, the release stub drives the pin from its aperture in the housing. The latch is then free to move. In this way, the wrapping splitter cannot be actuated unless the housing is placed on the base.

Embodiments of the housing and the base portion each have complimentary connecting interfaces which allow them to be assembled to each other, the connecting interfaces may take several forms. In one embodiment, components on the housing and base may form a hinge together while other complimentary components interlock when the housing and base are rotated against each other about the hinge. In other embodiments, connecting components on the housing or base may insert into apertures on the other. A retention mechanism may then engage the inserted component.

The electronic housing of the EAS device may have several electronic components within it. Among the several possible electronic components are: a microprocessor, a circuit board, a battery, a motion detector, an audible alarm producing element, radio frequency communication circuitry, an optical communication port, a light emitting diode, switches, and a passive EAS element such as an EAS core and coil element. The battery can be rechargeable or nonchargeable. Other types of onboard power supplies may also be used. The microprocessor monitors the switches to determine the physical state of the EAS device with respect to installation or tampering.

For embodiments of the EAS device, a blocking component or mechanism may be employed to physically prevent the release of a latch and the detaching of the housing from the base. In one embodiment, a biased blocking member moves into a blocking position when the latch engages between the housing and the base. The biased blocking member has a magnetically attractable element associated with it, and when a magnet is applied to the EAS device, the biased blocking member moves to a position where it no longer blocks the release of the latch. If a magnet is used to detach an EAS device without authorization, and the EAS device is still armed, the electronics detect an alarm condition and generate an alarm. In some embodiments a magnet may be built into a communication device so that the EAS device may be disarmed and its latch released for detachment using the same device.

Additional switches may be positioned to detect when a latching element has moved, or to detect when a blocking element has moved into a blocking position, and a switch may be provided to power up the device when it is first put into service. When the installation switch changes state, this indicates that the EAS device is attached to an object and is ready to be armed. The microprocessor or circuit board can detect switch status to determine when a latch is engaged between the housing and the base. Whether a switch is used to monitor a latching mechanism, or a blocking mechanism, or both, is determined by the physical design and characteristics of the EAS device. If these switches are used, they can provide additional signals or steps for the arming process.

Once the EAS device is fully applied to an object to be protected, it can be armed by the microprocessor, or it can be armed by the switch state, or a final step for arming may include communication from an external device of the larger EAS system. This communication may be wireless or through direct contact with the external device. If the communication is wireless, depending on the particular EAS device and system, the communication may be radio frequency communication or optical communication. The system with which the device wirelessly communicates may be an EAS system, an inventory system, the Internet, or some combination of those systems. Once the EAS device is attached to an object, it can interact with the larger EAS or inventory system until disarmed and removed from the object, or box.

Once an EAS device is assembled to an object and armed, unauthorized removal of the device is detected by the onboard electronics which sense an alarm condition via changes in state of any conditions required to arm the EAS device, such as changes of state in switches. In response to a detected alarm condition, the electronics can generate an alarm, including onboard audible alarms, or alarms communicated to the EAS system via infra red signals, radio frequency signals, or other communication methods.

Disarming of the EAS device may only be accomplished by authorized personnel. An authorized person having access to other elements of the EAS system such as a hand held communication device or a base station having communication capabilities may disarm the device. Depending on the embodiment of the EAS device, the communication may be accomplished via wireless communication or via contacts on the EAS device. In the former case, the wireless communication may be optical or radio frequency communication.

Some embodiments will add another element of security with passcode capabilities in the respective electronics. The EAS device electronics of these embodiments are capable of storing a passcode which is known to the communication elements of the EAS system and which can be used to confirm to the EAS device that the disarming signal is authorized. A further element of security can be added by using clock based algorithms to change the passcode synchronously. In those embodiments, the EAS system and the EAS device both have clock generators and are programmed with the same algorithm and both are programmed with the same initial passcode. As time passes, the algorithm alters the passcode at preset intervals as regulated by the clock generators. This changing passcode further complicates unauthorized attempts to disarm the EAS device. If an EAS device is detached without being disarmed with the appropriate passcode, the EAS device will detect an alarm condition and generate an alarm. In some system embodiments, the broader EAS system can reprogram the passcode of an EAS device. This allows an EAS device to be inserted into a time based algorithm system, or allows an EAS device to have a passcode reassigned as it is being armed, etc.

BRIEF DESCRIPTION OF DRAWINGS

Additional utility and features of the invention will become more fully apparent to those skilled in the art by reference to the following drawings, which illustrate some of the primary features of preferred embodiments.

DETAILED DESCRIPTION OF EMBODIMENTS OF THE INVENTION

Figure 1:
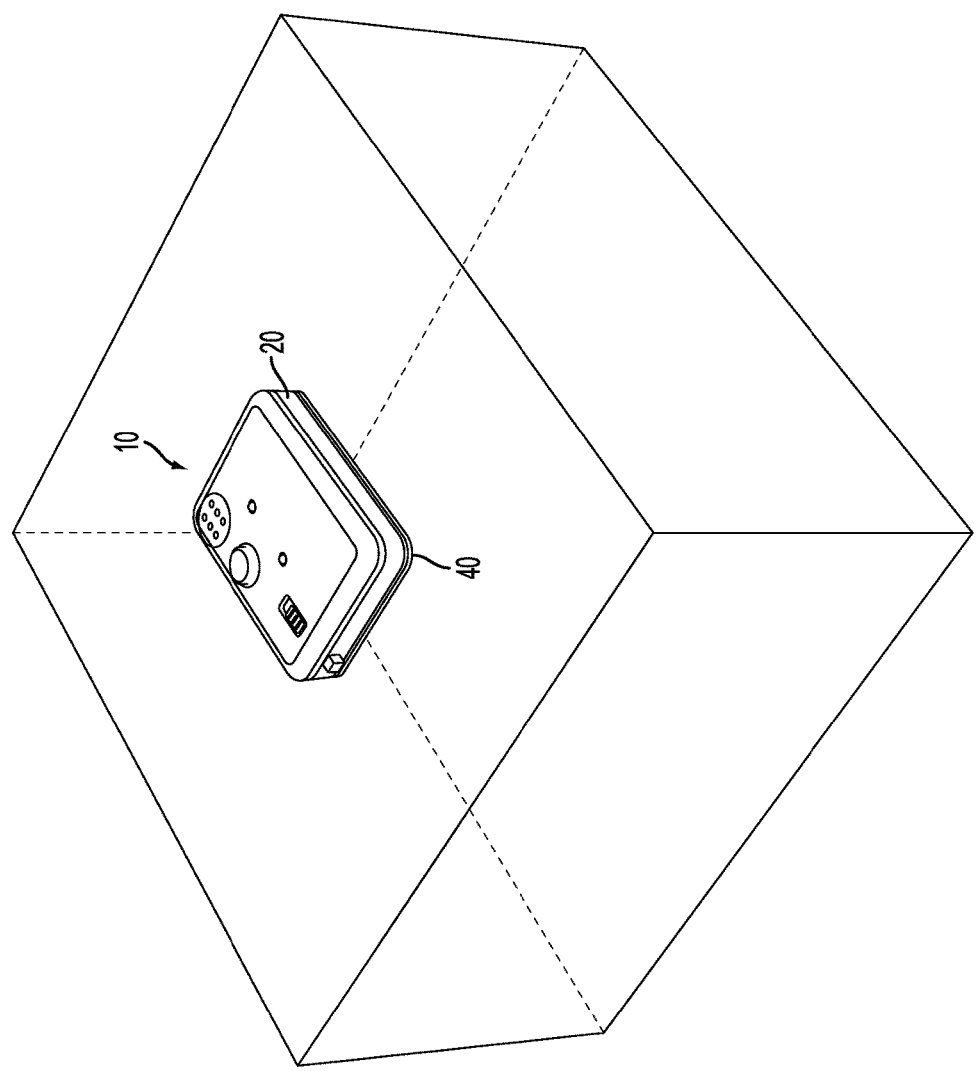
FIG. 1 shows an embodiment of an EAS device of the present invention affixed to a box.

FIG. 1 shows an embodiment of an EAS device 10 of the present invention affixed to a box. EAS device 10 has a housing 20 and a base 40. In the embodiment shown in FIG. 1, base 40 attaches to an object, such as a box, that is to be protected, and housing 20 attaches to base 40 in order to be attached to the object.

Figure 2:
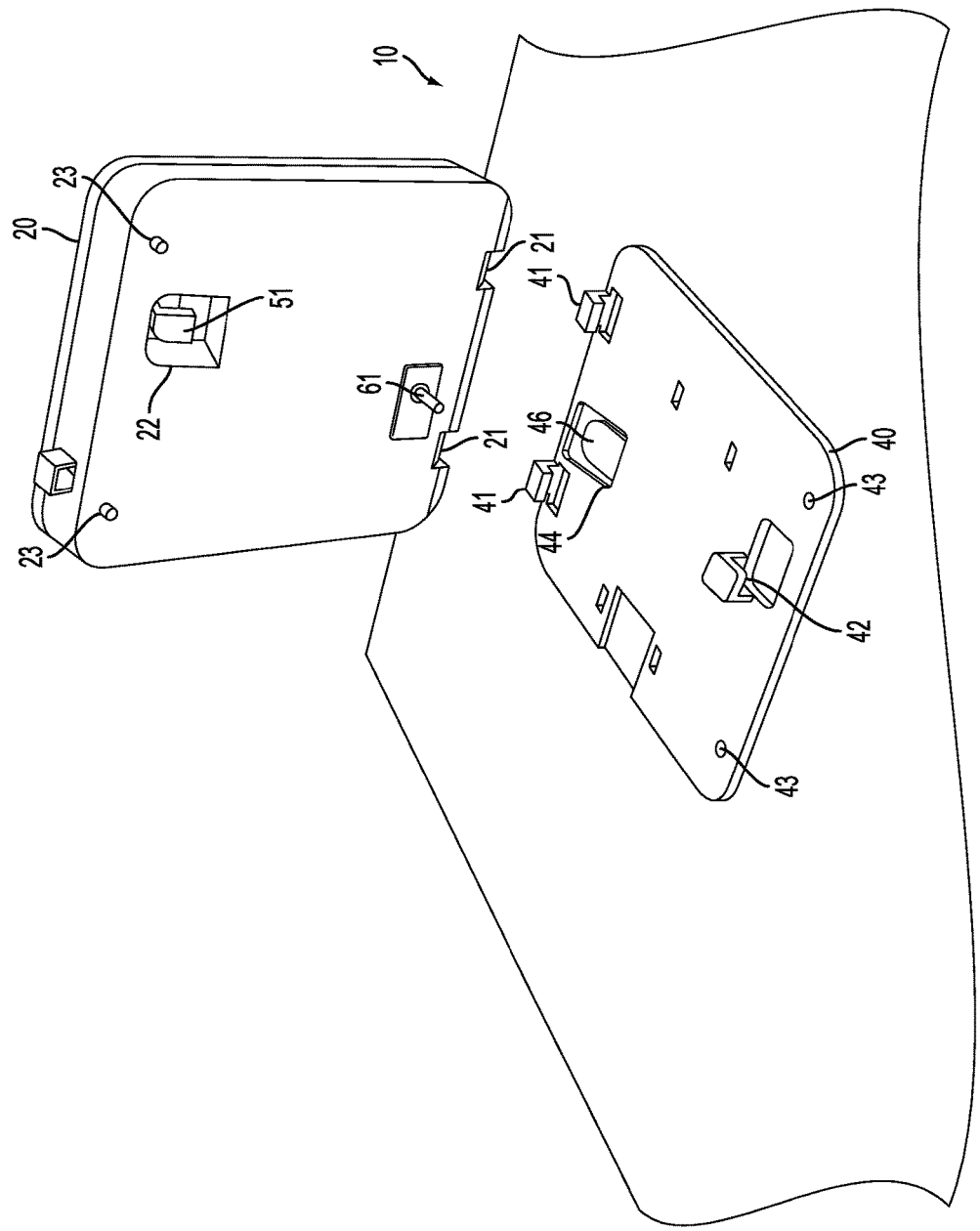
FIG. 2 shows an embodiment of an EAS device with its housing removed from its base.
Figure 6:
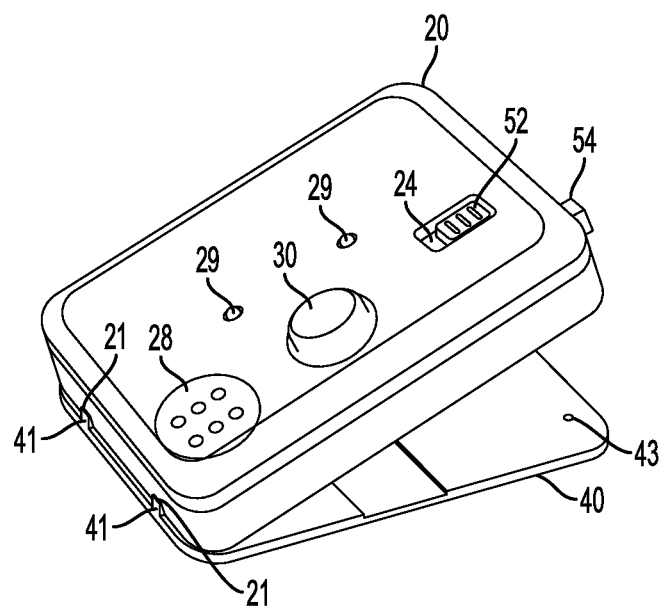
FIG. 6 shows the hinging hooks of a base of an embodiment of the EAS device engaged in receptacles in the housing of an embodiment an EAS device in the process of assembly or disassembly of the housing from the base.

Referring now to FIG. 2, EAS device 10 is shown with housing 20 removed from base 40 which is in place on an object to be monitored, such as a box containing a product. Housing 20 and base 40 each have complimentary attaching interfaces with respective complimentary components for assembling housing 20 and base 40 together. In FIG. 2, hinging hooks 41 are visible along the far edge of base 40. Not as visible in FIG. 2, are receptacles 21 along the lower side and bottom edge of housing 20. Receptacles 21 of housing 20 are located to match and receive hinging hooks 41 of base 40. Looking forward in the figures, FIG. 6 shows housing 20 partially assembled to base 40 with hinging hooks 41 engaged in receptacles 21. In the fore area of base 40 in FIG. 2, latch receiver 42 extends upwardly from the top surface of base 40. Latch receiver 42 is generally formed to engage with a latch element and therefore has a somewhat hooked or concave shape. At the same end of base 40 as latch receiver 42 in FIG. 2 are alignment apertures 43. In the embodiment of FIG. 2, latch pocket 22 is located and sized to receive latch receiver 42 when housing 20 and base 40 are assembled together, while alignment pins 23 are located and sized to fit into alignment apertures 43 in base 40. Visible in latch pocket 22 is latch hook 51. In the embodiment shown in FIG. 2, latch hook 51 can be moved to engage latch receiver 42 once housing 20 is assembled to base 40. When housing 20 is assembled to base 40, alignment pins 23 insert into alignment apertures 43 to provide positive location and stability until latch hook 51 is engaged into latch receiver 42.

Figure 4:
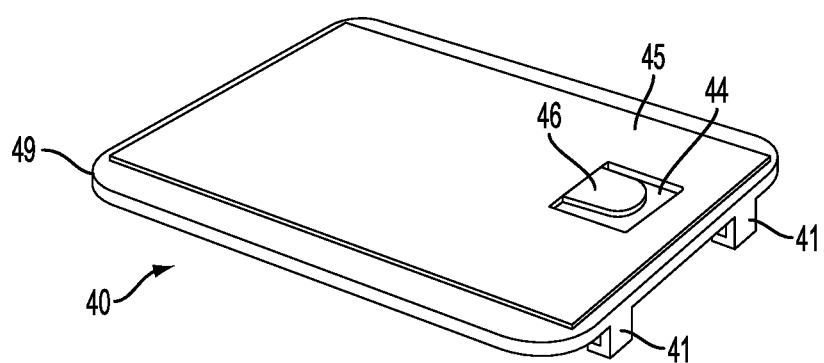
FIG. 4 shows the bottom of the base of an embodiment of an EAS device such as shown in FIG. 1 or FIG. 2.
Figure 11:
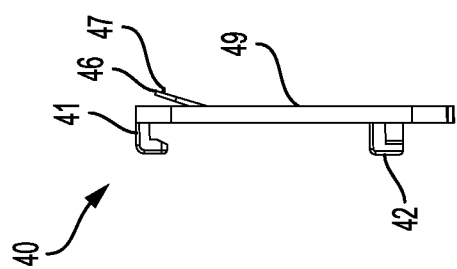
FIG. 11 is a side view of an embodiment of a base for an EAS device.
Figures 15, 16:
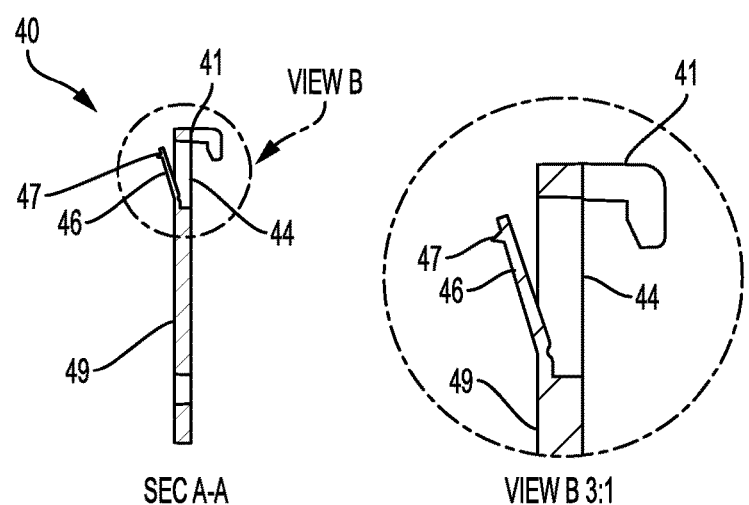
FIG. 15 is a section view of the embodiment of a base for an EAS device of FIG. 10.
FIG. 16 is a magnified section view of the embodiment of a base for an EAS device of FIG. 11 showing the flexible tab.

Installation switch 61 extends from the bottom surface of housing 20. Base aperture 44 and flexible tab 46 in base 40 are located to match the location of installation switch 61 when housing 20 is assembled to base 40. Referring to FIGS. 11, 15, and 16, it may be seen that flexible tab 46 extends out from bottom surface 49 of base 40. (Bottom surface 49 is not visible in FIG. 2.) When base 40 is attached to an object, such as in FIG. 2, flexible tab 46 is pushed up into aperture 44. FIGS. 2 and 4 show flexible tab 46 flexed to be level with bottom surface 49 of base 40.

Figure 3:
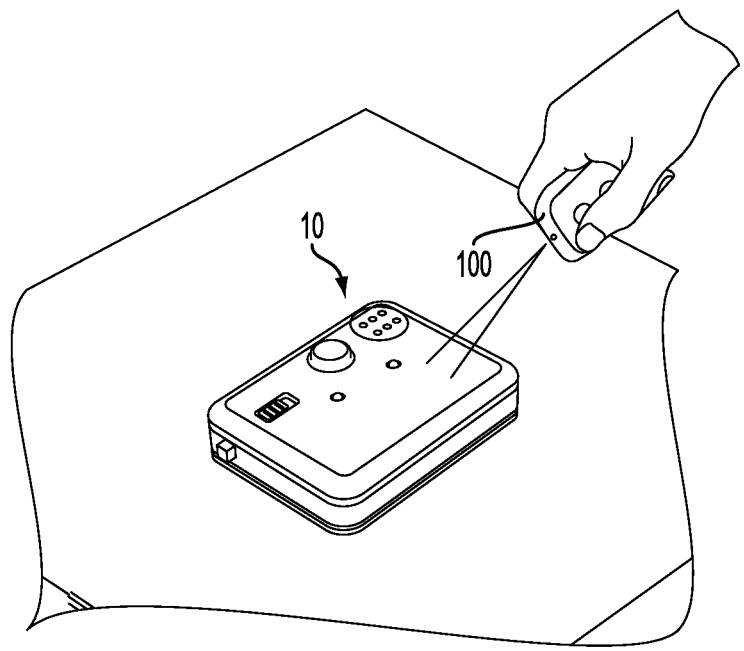
FIG. 3 shows an embodiment of the EAS device being communicated with using a remote device.

When the bottom of base 40 is contacting an object, as when EAS device 10 is assembled to an object, shown in FIG. 1 and FIG. 3, installation switch 61 has its state changed and the electronics can interpret this as an arming signal, i.e. EAS device 10 is installed and communication from an exterior device can initiate secure monitoring of the object. Once installed, if housing 20 and base 40 are removed without EAS device 10 being disarmed, flexible tab 46 moves back to its position away from bottom surface 49 of base 40. This allows installation switch 61 to change state which communicates an alarm condition to the electronics of EAS device 10. EAS device 10 can generate a system alarm by communicating its change of status with the system via radio frequency communication from the electronics in housing 20 or other forms of communication. If the box to which EAS tag 10 is attached has plastic wrapping, flexible tab 46 has enough resilience to move the wrap and return to its position away from bottom surface 49. This creates a space within the plastic wrap to allow switch 61 to change state and signal the electronics of EAS tag 10, that it has been removed without being disarmed.

Some embodiments of base 40 may have a piercing element to precut the plastic wrapping in the location of the switch. In some embodiments, this puncturing element is located on flexible tab 46 and serves the purpose of weakening the wrapping so that flexible tab 46 may more easily move the plastic away and allow switch 61 to extend. FIGS. 15, 16, 19, and 20, in particular illustrate piercing elements 47, 48. In other embodiments, the piercing element is carried on a removable portion of base 40. In these latter embodiments, the precutting of the wrapping may occur after base 40 is installed, as opposed to when base 40 is installed. The precut also leaves an aperture in the plastic wrapping for switch 61. If EAS device 10 is removed, switch 61 can extend through the plastic wrapping to generate a signal.

FIG. 3 shows a hand held remote 100 activating EAS device 10. The assembly of EAS device 10 to an object establishes the conditions for activating, or arming, EAS device 10. Hand held remote 100 may communicate with EAS device 10 with any of several known methods. These methods may include infrared communication and radio frequency communication as well as other known communication methods. Handheld remote 100 may also be used to deactivate, or disarm EAS device 10 to allow EAS device 10 to be removed without causing an alarm. The electronics of some embodiments of EAS device 10 may have passcode protection. These embodiments are capable of storing a passcode which is required to be matched by handheld remote 100 for the communication from handheld remote 100 to be authorized. For further protection, the electronics of some embodiments of EAS device 10 may include a clock generator and the electronics may have machine readable instructions with an algorithm to change the passcode at pre-programmed time intervals. The broader EAS system, including handheld remote 100, also has at least one clock generator and is capable of updating the passcode at the preset intervals to update the systems record of the passcode. This keeps the passcode between EAS device 10 and the rest of the EAS system synchronized.

FIG. 4 shows the bottom surface of base 40. Bottom surface of base 40 has an adhesive element 45. Adhesive element 45 facilitates the assembly of EAS device 10 on an item to be protected and is constructed, or applied in such a manner as to not cover flexible tab 46. Base 40 is placed on an item to be protected with adhesive elements 45 on the bottom surface of base 40 contacting the object, such as to place the top surface of base 40 in an exposed position. Once base 40 is satisfactorily installed on an object desired to be protected, as shown in FIG. 2, housing 20 may be installed on base 40. Adhesive element 45 on bottom surface of base 40 may be comprised of a pressure sensitive adhesive pad, a pre-applied contact adhesive, or may even be an adhesive applied at the time of use, such as a spray, paste, pressure sensitive adhesive pad, or other applicable adhesive, as long as adhesive element 45 does not cover flexible tab 46 and negate the interaction of installation switch 61 and flexible tab 46.

Figure 5:
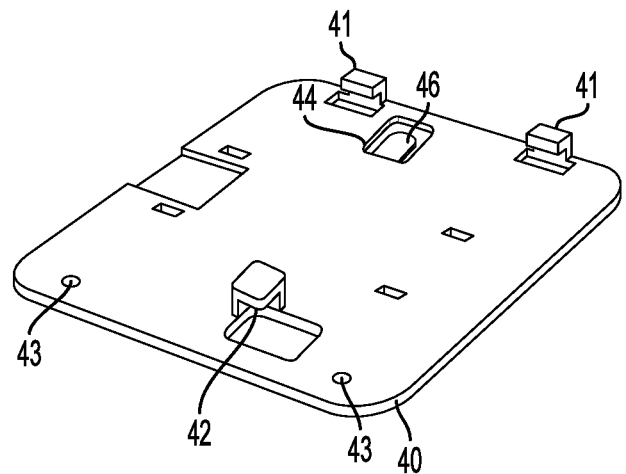
FIG. 5 shows the top of an embodiment of the base for an EAS device.

FIG. 5 shows the top surface of base 40. Many of the elements visible in FIG. 5, such as the attaching components, have already been described with respect to FIG. 2. Along one edge of base 40 are hinging hooks 41. Latch receiver 42 extends upwardly from the top surface of base 40 in the opposite end of base 40 from hinging hooks 41.

FIG. 6 is a perspective view of hinging hooks 41 of base 40 engaging receptacles 21 of housing 20. In FIG. 6, housing 20 is angled upward from base 40 along the edge of base 40 where hinging hooks 41 are located. Hinging hooks 41 of base 40 are engaged in receptacles 21 forming an initial, rotational connection between base 40 and housing 20. To complete assembly of housing 20 to base 40, housing 20 is rotated down onto base 40 where complimentary connecting interfaces may be engaged to secure housing 20 to base 40.

Figure 7:
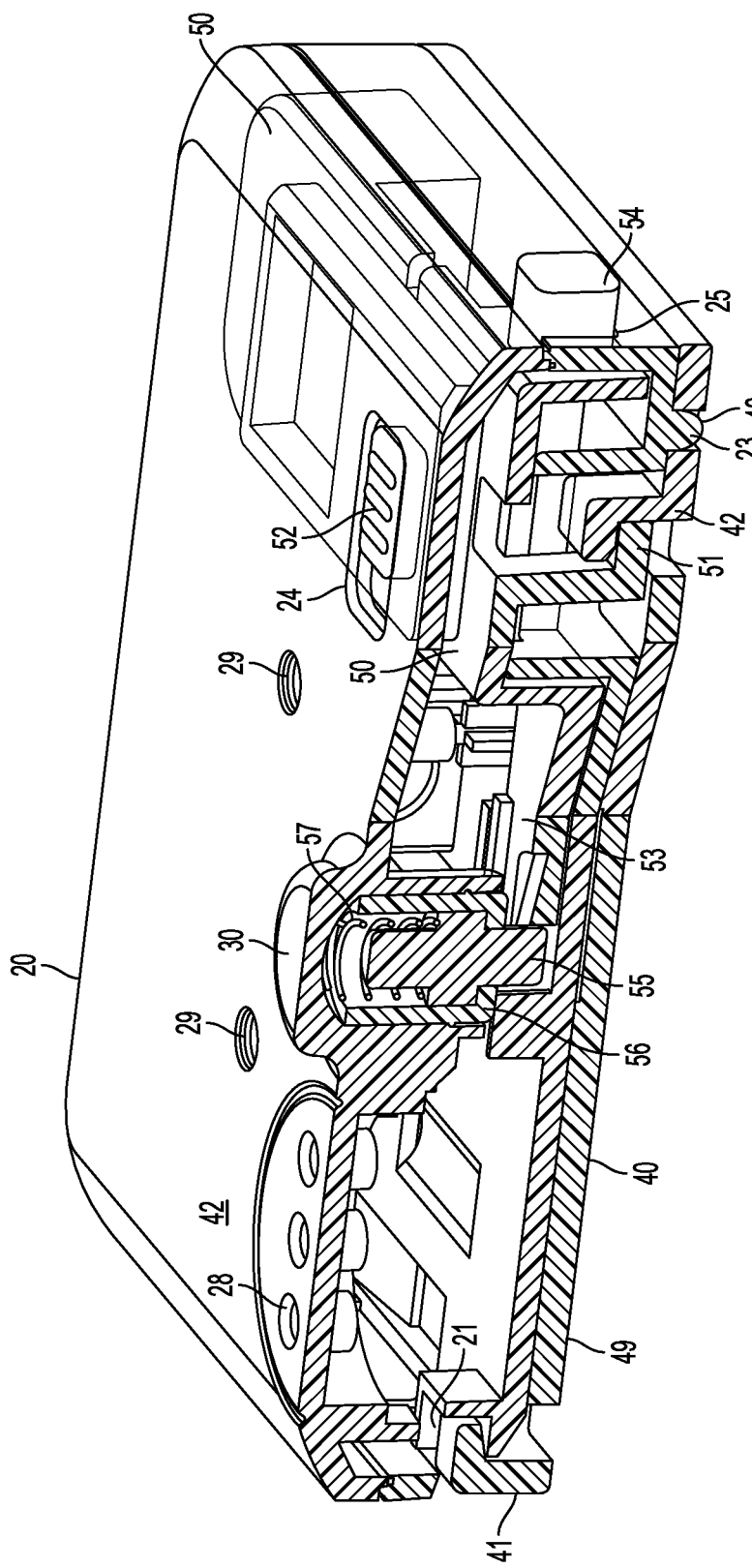
FIG. 7 is a sectioned view of the housing and base of an embodiment of an EAS device latched in assembly and showing a latch and blocking component.

FIG. 7 is a sectioned view of housing 20 and base 40 of an embodiment of an EAS device 10 latched in assembly and showing a latch 50 holding housing 20 and base 40 together. A blocking component, which in the embodiment of FIG. 7 is a blocking pin 55, prevents disengagement of latch 50. Several elements previously described are visible in the section view of FIG. 7. At the far left, hinging hooks 41 of base 40 are engaged in receptacles 21 of housing 20. Toward the right end of the section, a latch receiver 42 is inserted up into a latch pocket 22 where a latch hook 51 engages latch receiver 42. Further to the right, an alignment pin 23 in housing 20 engages an alignment aperture 43 in base 40.

In the embodiment shown in FIG. 7, latch 50 is a manually operated sliding latch and once it is slid to engage latch hooks 51 into latch receivers 42, blocking pin 55 moves into place to prevent its return to a non-engaged position. Blocking pin 55 is contained within cup 56 and spring 57 biases blocking pin 55 toward a blocking position. In the embodiment of FIG. 7, engagement slide 52 extends upward from the body of latch 50 and is exposed through slide aperture 24 in housing 20, which gives a user access to engagement slide 52 to move latch 50 to an engaged state. When latch 50 is moved to an engaged state, guide 53 on latch 50 is moved out from beneath blocking pin 55 allowing blocking pin 55 to shift position to perform a blocking function. When latch 50 is moved to an engaged position, release button 54 on latch 50 is extended out through button aperture 25 in the side of housing 20.

Figure 8:
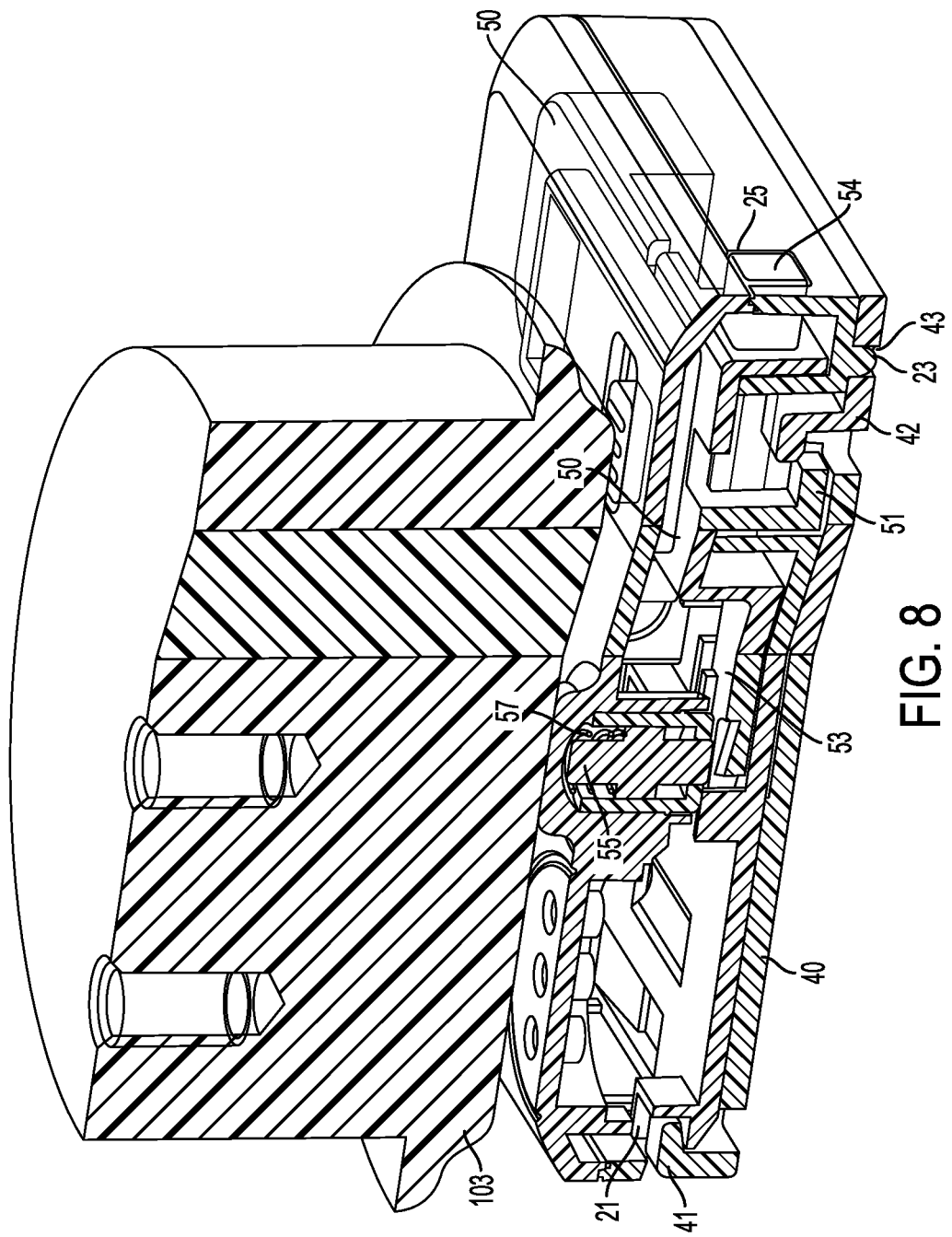
FIG. 8 is a sectioned view of the housing and base portion of the embodiment of an EAS device of FIG. 7 having a magnet applied to shift the blocking component and allow the unlatching of the two portions.

FIG. 8 is a sectioned view of housing 20 and base 40 of the embodiment of an EAS device 10 shown in FIG. 7 having a magnet 103 applied to housing 20 to shift blocking pin 55 to a non-blocking position. Blocking pin 55 has some magnetically attractable element associated with it which allows magnet 103 to act upon it to overcome spring 57 and shift blocking pin 55 to the non-blocking position. Once blocking pin 55 is shifted to a non-blocking position, release button 54 may be depressed to shift latch 50 to the left in FIG. 8, moving guide 53 on latch 50 under blocking pin 55 to maintain blocking pin 55 in a non-blocking position. As may be seen in FIG. 8, when release button 54 is depressed and latch 50 is moved to the left, latch hook 51 on latch 50 disengages from latch receiver 42. The disengagement of latch hook 51 from latch receiver 42, allows housing 20 to rotate upward about the interface of hinging hook 41 on base 40 with receptacle 21 on housing 20 seen at the left in FIG. 8. Returning to FIG. 6, housing 20 may be seen engaged with base 40 and rotating about the engagement between hinging hooks 41 and receptacles 21. In the embodiment shown in FIG. 8, the top of release button 54 becomes flush with the side of housing 20 when latch 50 is moved to an unengaged position, and engagement slide 52 moves to the left in slide aperture 24.

Figure 9:
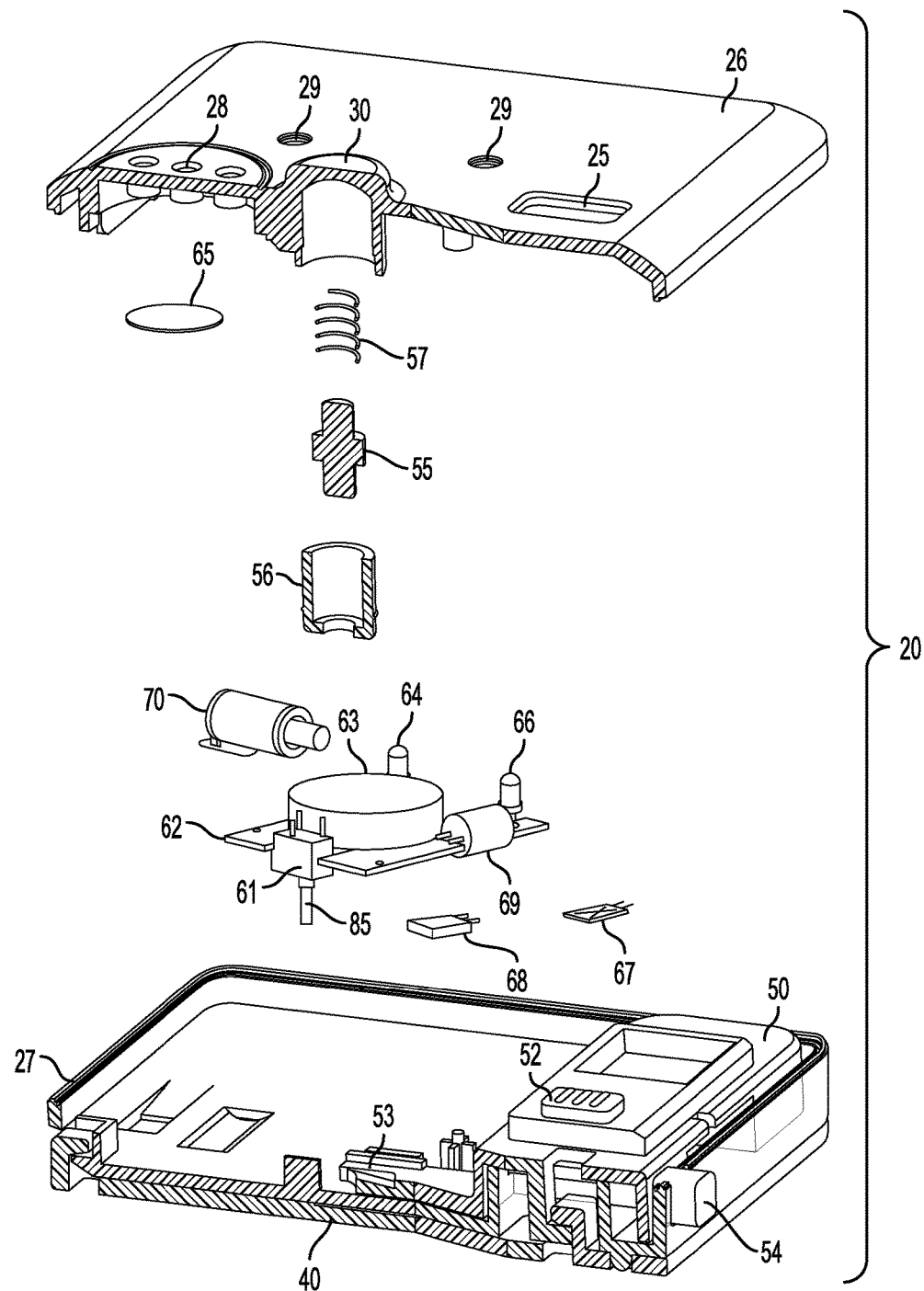
FIG. 9 is an exploded section view of an embodiment of an EAS device housing showing electronics and other internal elements.

FIG. 9 is an exploded section view of an embodiment of an EAS device 10 housing 20 showing electronics and other internal elements. In the embodiment shown in FIG. 9, housing 20 is assembled from two halves, a top half 26 and a bottom half 27 which enclose and support several elements. Latch 50 is seated in bottom half 27, while blocking pin 55, cup 56, and spring 57 are disassembled vertically above bottom half 27.

FIG. 9 shows the electronics 60 enclosed in housing 20. Circuit board 62 provides an internal mount for several of the electronic components. In the embodiment shown in FIG. 9, installation switch 61, previously described with respect to FIG. 2, is mounted to circuit board 62. Other elements that may be housed within EAS device 10 include microprocessor 63, infrared communication port 64, audible alarm generator 65, light emitting diode 66, radio frequency communication elements 67, motion detector 68, and battery 69, many of which may mount directly to circuit board 62. Additionally, housing 20 may also carry a core and coil electronic article surveillance element 70.

Circuit board 62 and microprocessor 63 are capable of storing machine readable instructions and are programmable to monitor the status of EAS device 10 and to communicate with remote programmers and other elements of an EAS system. Circuit board 62 and microprocessor 63 may be reprogrammed via communication with hand held remotes, such as handheld remote 100 in FIG. 3, or other elements of an EAS system when communicating with these devices. In the embodiment shown in FIG. 9, circuit board 62 and microprocessor 63 can communicate via infrared communication port 64 and also receive programming instructions. Audible alarm generator 65 is capable of generating an audible alarm when EAS device 10 is tampered with, for example, in an attempted forced separation of housing 20 and base 40. Audible alarm generator 65 may also be used to indicate the status of EAS device 10 as it is assembled, for example, when installation switch 61 has been actuated through assembly of housing 20 and base 40 onto an object. Similarly, LED 66 can be used to provide visual cues for the status of EAS device 10. Battery 69 generally provides power for the electronic components of EAS device 10, and may or may not be rechargeable or replaceable.

EAS element 70 is a passive element compatible with prior art EAS systems. These EAS systems generate what is called an interrogation field at a given frequency. These interrogation fields will build up a small amount of stored energy on passive EAS elements brought into the zone. When the interrogation field is turned off and the EAS system listens for a response, the passive EAS elements dissipate their energy and generate a signal at a designed frequency. The EAS system is capable of detecting the signal as an indication of the unauthorized presence of the passive elements and can generate an alarm based on the signal. The EAS elements 70 contained within the embodiment of EAS device 10 in FIG. 9 are compatible with prior art and legacy systems providing an addition security mechanism. In addition to the prior art system detection of the passive EAS element 70, in some embodiments circuit board 62 and microprocessor 63 can monitor the status of passive element 70 and issue an alarm as well. If microprocessor 63 or circuit board 62 detects energy storage and dissipation activity in the coil, then audible alarm generator 65 may be instructed to generate an alarm or the communication capabilities of the electronics 60 may be employed to broadcast a signal to respective receivers in the broader EAS system to generate an alarm.

Top half 26 of housing 20 provides the necessary apertures for the electronic components of EAS device 10 to communicate with its environment. Sound apertures 28 allow audible alarms generated by audible alarm generator 65 easier escape to the surroundings, while light apertures 29 are generally aligned with infrared communication port 64 and LED 66 to allow direct line of sight communication via those elements. Light apertures 29 may or may not have some type of translucent covering. Additionally, top half 26 of housing 20 has a dome 30 where blocking pin 55 is housed which provides a visual cue where to apply magnet 103 to allow disengagement of latch 50.

Alternatively, installation switch 61 on the bottom of housing 20 may be used to monitor the status of EAS device 10. When housing 20 is assembled to base 40, installation switch 61 is actuated, informing circuit board 62 and microprocessor 63 of the status of the device. Unauthorized separation of housing 20 from base 40, or the unauthorized removal of EAS device 10 from an article, changes the status of installation switch 61, and the electronics 60 of housing 20 will detect this and respond as programmed.

Figure 12:
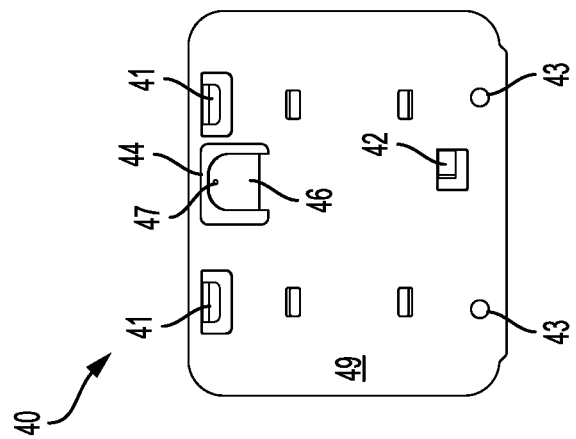
FIG. 12 is a bottom view of an embodiment of a base for an EAS device.
Figure 10:
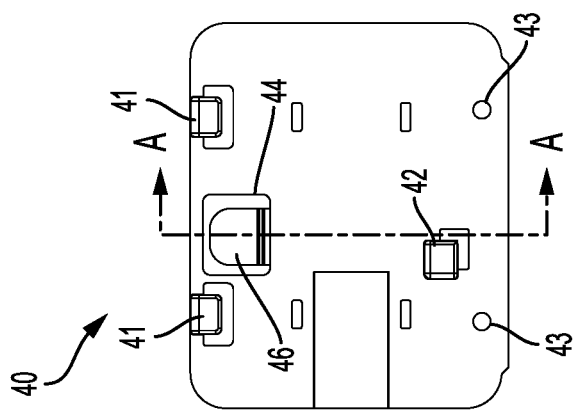
FIG. 10 is a top plan view of an embodiment of a base for an EAS device.
Figure 13:
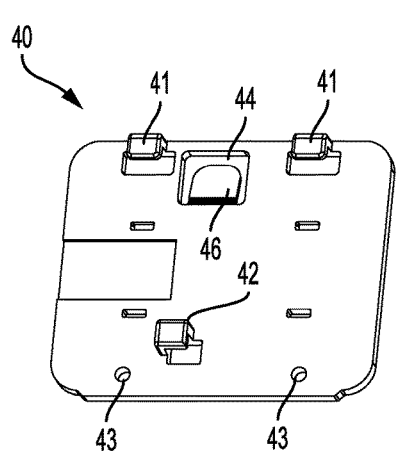
FIG. 13 is a top perspective view of an embodiment of a base for an EAS device.
Figure 14:
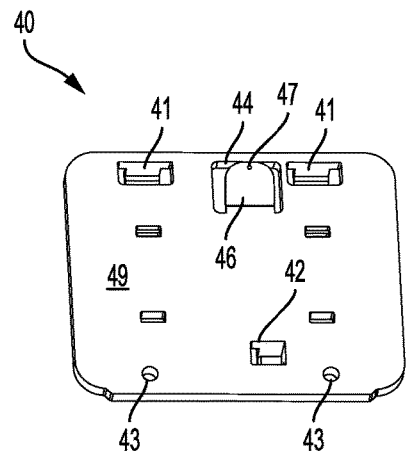
FIG. 14 is a bottom perspective view of an embodiment of a base for an EAS device.

FIGS. 10-14 provide several views of base 40. FIG. 10 is a top plan view of an embodiment of base 40 for an EAS device 10. FIG. 11 is a side view of an embodiment of base 40 for an EAS device. FIG. 12 is a bottom view of an embodiment of a base 40 for an EAS device 10. FIG. 13 is a top perspective view of an embodiment of a base 40 for EAS device 10. FIG. 14 is a bottom perspective view of an embodiment of a base 40 for an EAS device 10. Returning to FIGS. 12 and 14 and referring back to FIG. 4, some embodiments of base 40 have adhesive element 45 on bottom surface 49. Adhesive element 45 attached base 40 to an article. Hinging hooks 41 and latch receiver 42 provide a connecting interface to interact with a complementary connecting interface on housing 20 to connect housing 20 to base 40.

FIGS. 15 and 16 provide more detailed view of flexible tab 46. FIG. 15 is a section view of the embodiment of a base 40 for an EAS device 10 of FIG. 10. FIG. 16 is a magnified section view of the embodiment of a base 40 for an EAS device 10 of FIG. 11 showing flexible tab 46. Flexible tab 46 may be seen in FIGS. 11, 15, and 16 extending from base 40 out past the plane of bottom surface 49 of base 40. This provides a space for the extension of a switch such as switch 61 shown in FIG. 2. When base 40 is applied to a box, flexible tab 46 is moved into alignment with bottom surface 49 of base 40. FIG. 4 shows flexible tab 46 flattened in alignment with bottom surface 49. If base 40 is removed from an object, flexible tab 46 moves back to its position extending from base 40 and creates a space into which switch 61 will extend. This changes the state of switch 61 which sends a signal to the electronics of EAS device 10. The electronics of EAS device 10 interpret this signal as programmed.

FIGS. 15 and 16 also prominently show piercing protrusion 47 extending from the bottom of flexible tab 46. Piercing protrusion 47 is sized and positioned to snag into a plastic wrap present on an article when base 40 is attached to the article. As base 40 is applied to an article, flexible tab 46 is pushed up into aperture 44, and the motion of flexible tab 46, while piercing protrusion 47 is engaged with the plastic wrap causes the wrap to be pre-torn, or precut. If EAS device 10 is removed, this precut of the wrap makes it easier for flexible tab 46 to push out the wrap and allow switch 61 to extend and change state. Referring back to FIGS. 11, 12, and 14, piercing protrusion 47 may also be seen.

Figure 17:
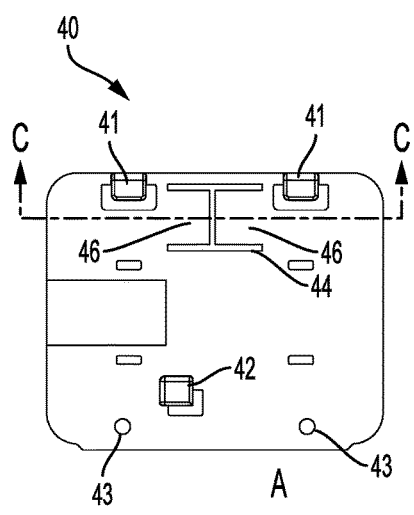
FIG. 17 is a top plan view of another embodiment of a base for an EAS device.
Figure 18:
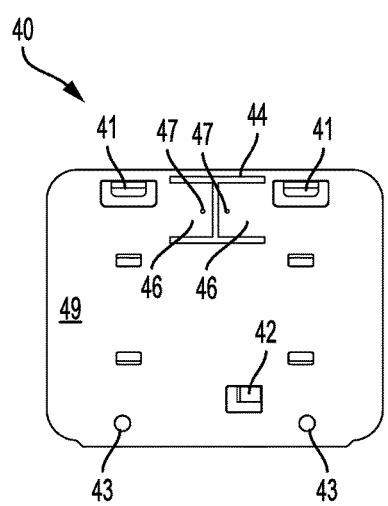
FIG. 18 is a bottom view of another embodiment of a base for an EAS device.
Figure 19:
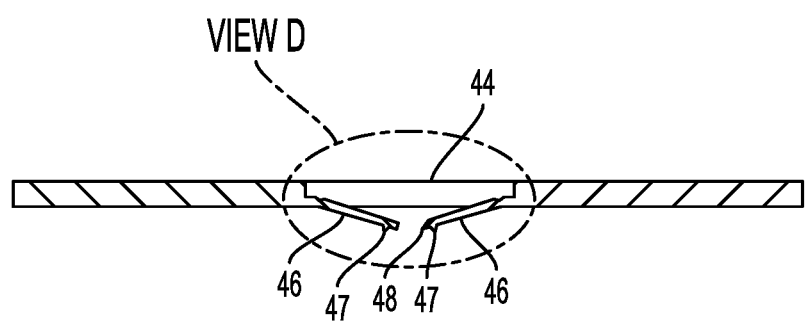
FIG. 19 is a section view of the embodiment of a base for an EAS device of FIG. 17.
Figure 20:
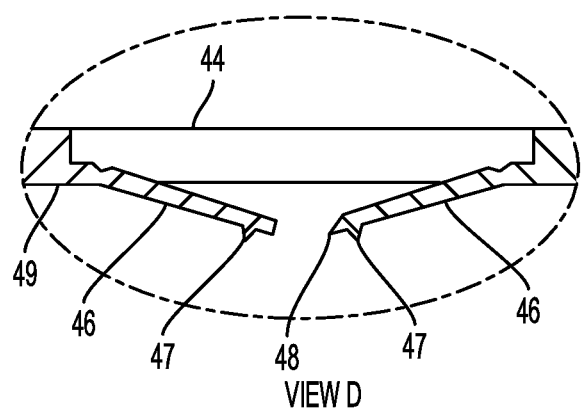
FIG. 20 is a magnified section view of the embodiment of a base for an EAS device of FIG. 19 showing two flexible tabs.

FIGS. 17-20 show additional embodiments of base 40. These embodiments have two flexible tabs 46 extending into aperture 44. FIG. 17 is a top plan view of an embodiment of base 40 for an EAS device 10, and FIG. 18 is a bottom view of an embodiment of base 40 for an EAS device 10. FIGS. 19 and 20 show piercing elements 47 and 48. FIG. 19 is a section view of the embodiment of a base for an EAS device of FIG. 17, and FIG. 20 is a magnified section view of the embodiment of a base for an EAS device of FIG. 19 showing two flexible tabs 46 extending into aperture 44. Piercing elements 47, 48 are shown in FIGS. 19 and 20. Piercing protrusions 47 on both flexible tabs 46 are sized and located to engage plastic wrap on an article as base 40 if applied to an article. In FIGS. 19 and 20, the flexible tab 46 on the right also has piercing end 48. The end of the flexible tab 46 on the right has an end shaped to snag into plastic wrap on an article as base 40 is applied to an article. As with embodiments with a single flexible tab 46, the motion imparted to flexible tabs 46 as they are pushed up into aperture 44 pre-tears or precuts the plastic wrap. This makes it easier for flexible tabs 46 to push out a space for switch 61 to extend if EAS tag 10 is removed from an article.

Figure 21:
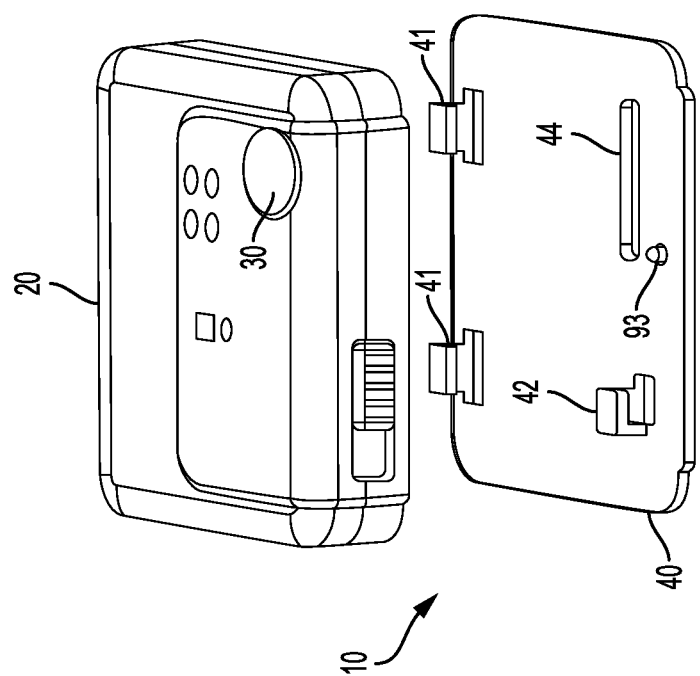
FIG. 21 is a top perspective view of an embodiment of another EAS device with the housing positioned above the base.

FIG. 21 is a top perspective view of an embodiment of EAS device 10 with housing 20 positioned above base 40. In the embodiment of EAS device 10 of FIG. 21, base 40 has hinging hooks 41, latch receiver 42, and base aperture 44, as before. However, in the embodiment of FIG. 21, base aperture 44 is elongated as compared to previous embodiments of base 40. Also, in the embodiment of FIG. 21, base 40 has release stub 93 on its top surface, proximal to base aperture 44. Release stub 93 will be discussed below. In FIG. 21, dome 30 and slide 52 are visible on housing 40, similar to previously discussed embodiments of EAS device 10.

Figure 22:
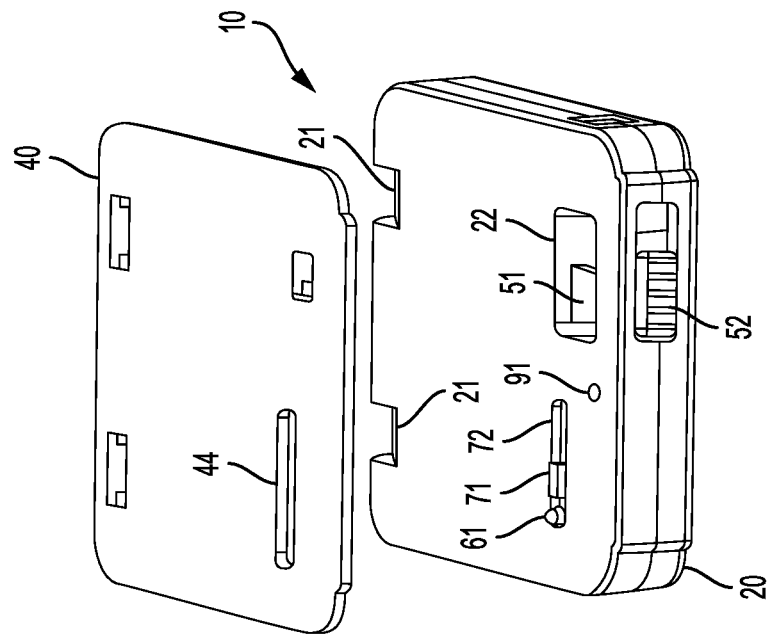
FIG. 22 is a bottom perspective view of the embodiment of an EAS device of FIG. 21 with the base positioned above the housing.

FIG. 22 is a bottom perspective view of the embodiment of EAS device 10 of FIG. 21 with base 40 positioned above housing 40. Elongated base aperture 44 passes through base 40 and is visible in FIG. 22. Similarly to previously discussed embodiments EAS device 10, housing 20 has receptacles 21 along one side of its bottom surface and latch pocket 22 recessed into its bottom surface. Latch hook 51 is located in latch pocket 22 in housing 20 and slide 52 is located on the side of housing 20. The bottom of housing 20 also has bottom aperture 72 and restrainer aperture 91. Restrainer aperture 91 is positioned to align with release stub 93 and will be discussed more below. Bottom aperture 72 is positioned to align with base aperture 44 and each are elongated in the embodiment of FIGS. 21 and 22. Protruding through bottom aperture 72 are wrapping splitter 71 and switch 61.

Switch 61 is long enough to also extend through base aperture 44 of base 40 and detects when EAS device 10 is assembled on an object to be protected. Wrapping splitter 71 moves along elongated bottom aperture 72 and, for at least part of that movement, extends far enough to extend through both bottom aperture 72 and base aperture 44. As it extends through base aperture 44 and moves along it, wrapping splitter 71 tears, or splits, the wrapping of the object to which it is attached. This prevents the wrapping from being used to defeat the operation of switch 61 which would otherwise detect the removal of EAS device 10 from the object.

Figure 25:
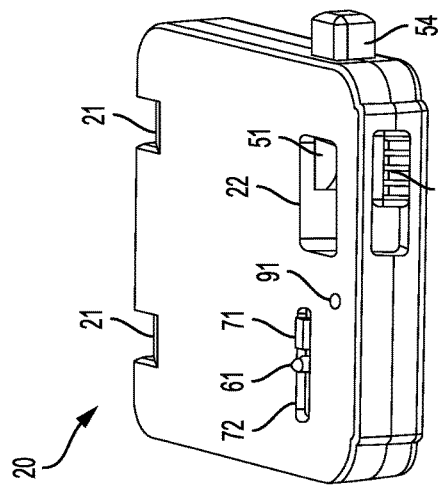
FIG. 25 is a bottom perspective view of the housing of an embodiment of an EAS device with the latch, switch, and wrapping splitter in a third position.
Figure 24:
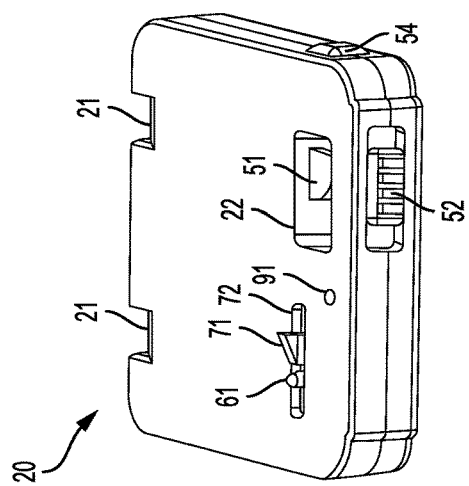
FIG. 24 is a bottom perspective view of the housing of an embodiment of an EAS device with the latch, switch, and wrapping splitter in a second position.
Figure 23:
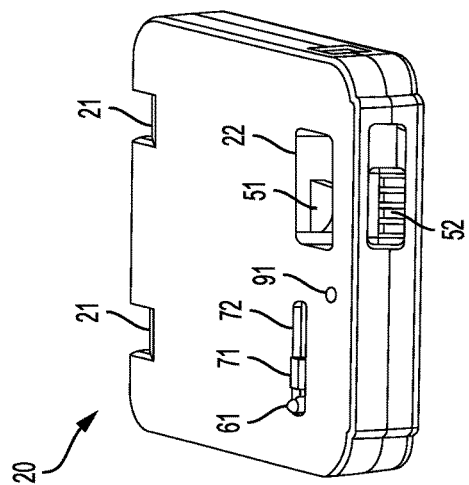
FIG. 23 is a bottom perspective view of the housing of an embodiment of an EAS device with the latch, switch, and wrapping splitter in a first position.

In some embodiments of EAS device 10 with wrapping splitter 71, the movement of wrapping splitter 71 is actuated by the sliding latch that is engaged to maintain housing 20 on base 40. In FIG. 22, latch hook 51 and latch slide 52 are exposed elements of a sliding latch located internal to housing 20. FIGS. 23-25 are bottom perspective views of housing 20 showing wrapping splitter 71 and switch 61 progressing along bottom aperture 72 as latch slide 52 and latch hook 51 move. FIG. 23 shows switch 61, wrapping splitter 71, latch hook 51, and latch slide 52 in a first position. FIG. 24 shows switch 61, wrapping splitter 71, latch hook 51, and latch slide 52 in a second position. FIG. 25 shows switch 61, wrapping splitter 71, latch hook 51, and latch slide 52 in a third position. Switch 61 and wrapping splitter 71 progress along with latch slide 52 and latch hook 51. In FIGS. 24 and 25, release button 54 is shown partially extended (FIG. 24) and fully extended (FIG. 25).

Figure 27:
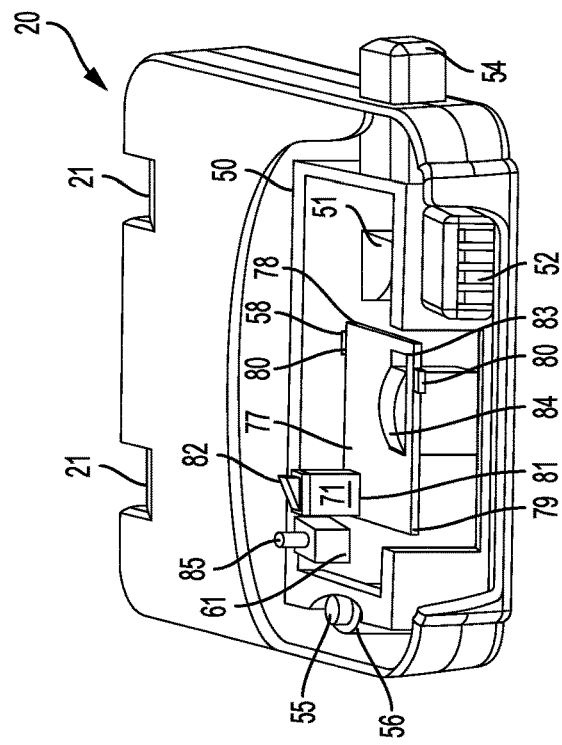
FIG. 27 is a bottom perspective view of a cutaway of the housing of an embodiment of an EAS device showing another embodiment of a wrapping splitter.
Figure 26:
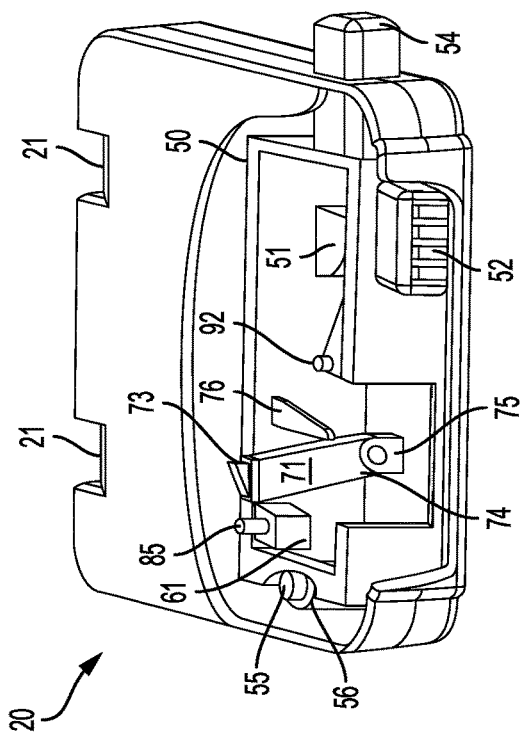
FIG. 26 is a bottom perspective view of a cutaway of the housing of an embodiment of an EAS device showing an embodiment of a wrapping splitter.

Various mechanical works may be used to connect the operation of wrapping splitter 71 with latch 50. FIGS. 26 and 27 show two different embodiments of mechanical works coordinating the operation of wrapping splitter 71 with latch 50. The embodiments of FIGS. 26 and 27 should not be considered as exhausting the possible mechanical works that could be used.

FIG. 26 is a bottom perspective view of a cutaway of housing 20 of an embodiment of EAS device 10 showing an embodiment of the mechanical works connecting wrapping splitter 71 with latch 50. In FIG. 26, a wall of slide 50 is also partially cutaway to show the interaction of wrapping splitter 71, latch 50, and housing 20. In the embodiment of FIG. 26, wrapping splitter 71 has splitting end 73 and pivot end 74. Splitting end 73 of wrapping splitter 71 is the end that extends through bottom aperture 72 of housing 20 and base aperture 44 of base 40. (Bottom aperture 72 is cutaway in FIG. 26) Pivot end 74 is pivotally mounted in housing 20. Pivot 75 is joined to housing 20 and provides a pivot mount for pivot end 74 of wrapping splitter 71. Wrapping splitter 71 is positioned proximal to latch 50. In the embodiment of FIG. 26, switch 61 is mounted to slide 50 to one side of wrapping splitter 71. On the other side of wrapping splitter 71 from switch 61, splitter guide 76 extends from latch 50. Together, switch 61 and splitter guide 76 move wrapping splitter 71 back and forth with latch 50. As switch 61 and splitter guide 76 move wrapping splitter 71 back and forth, splitting end 73 of wrapping splitter 71 moves through an arc about pivot 75. As it moves through the arc, splitting end 73 extends through base aperture 44 and splits, or tears, the wrapping of the package. In the embodiment of FIG. 26, latch 50 moves switch 61 to a location where the wrapping has been split or torn.

Some embodiments of EAS device 10 may employ a restraining mechanism to prevent latch 50 from being slid from an unlatched position to a latched position, while the bottom of housing 20 is exposed. This may be a safety feature to prevent the movement and extension of wrapping splitter 71, which may be sharp. In FIG. 26, restrainer pin 92 is flexibly mounted on latch 50 and sized and located to fit into restrainer aperture 91, when latch 50 is in an unlatched position. When housing 20 is positioned on base 40 to engage hinging hooks 41 into receptacles 21 of housing 20, and housing 20 is rotated down onto base 40 (see FIGS. 2 and 6), release stub 93 (see FIG. 21) fits into restrainer aperture 91, and release stub 93 displaces restrainer pin 92 from restrainer aperture 91. This allows latch 50 to be slid. As latch 50 is slid, it actuates wrapping splitter 71.

FIG. 27 is a bottom perspective view of a cutaway of housing 20 of an embodiment of EAS device 10 showing another embodiment of the mechanical works connecting wrapping splitter 71 with latch 50. In FIG. 27, a wall of slide 50 is also partially cutaway to show the interaction of wrapping splitter 71, latch 50, and housing 20. In FIG. 27, the cutaway of slide 50 is more extensive, and the restrainer pin 92 is not shown. In the embodiment of FIG. 27, cantilever panel 77 has a fixed end 78 and a free end 79. Fixed end 78 has flat tabs 80 which fit into flat apertures 58, which holds fixed end 78 of cantilever panel 77 in a fixed position with respect to slide 50 (In FIG. 27, the cutaway of the latch removes the flat aperture in the foreground, leaving a flat tab 80 exposed). In FIG. 27, fixed end 81 of wrapping splitter 71 is fixed to cantilever panel 77 near its free end, such that splitting end 82 of wrapping splitter 71 is positioned in, or aligned with, bottom aperture 72 (see FIGS. 22-25).

Cantilever panel 77 has cam slot 83 in it. Cam 84 is fixed to housing 40 and positioned to be aligned with cam slot 83, so that cantilever panel 77 may act as a cam follower. As latch 50 is moved, cantilever panel 77 is moved with respect to cam 84, and cam 84 displaces free end 79 of cantilever panel 77. This pushes splitting end 82 of wrapping splitter 71 out through bottom aperture 72 as wrapping splitter 71 moves along with cantilever panel 77 and latch 50. Splitting end 82 splits, or tears, the wrapping on the object to which EAS device 10 is attached. In the embodiment of FIG. 27, switch 61 is mounted on latch 50 and, when latch 50 slides to a latched position, switch 61 moves to a position where the wrapping has been split, or torn. Other configurations of cams and followers may also be utilized to actuate wrapping splitter 71. As previously noted, the side of latch 50 is cutaway in FIG. 27 to an extent that restrainer pin 92 shown in FIG. 26 is not shown in FIG. 27.

Referring now to both FIGS. 26 and 27, blocking pin 55 has extended to move behind the end of latch 50 and maintain latch 50 in a latched position. Referring back to FIGS. 7-9 and the discussion regarding those figures, in some embodiments, blocking pin 55 has a magnetically attractable portion and may be retracted by application of a magnet to housing 20. With blocking pin 55 retracted, latch 50 may be moved to an unlatched position.

Figure 28:
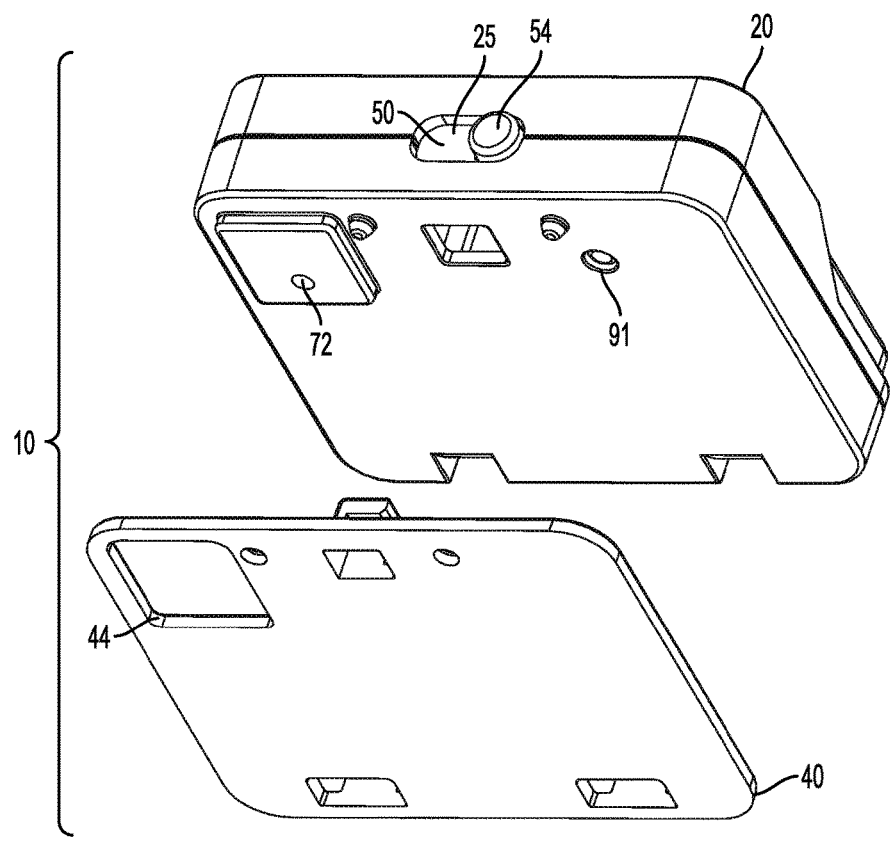
FIG. 28 is a bottom perspective view of another embodiment of an EAS device showing a housing above a base.

FIG. 28 is a bottom perspective view of another embodiment of an EAS device 10 showing housing 20 above a base 40. In the embodiment of FIG. 28, bottom aperture is 72 is smaller than other embodiments and is round, rather than elongated. As with previous embodiments, housing 20 has restrainer aperture 91 on its bottom surface for first receiving restrainer pin 92 to restrain latch 50, then receiving release stub 93 to displace restrainer pin 92 and release latch 50.

Housing 20 has a boss surrounding bottom aperture 72. This boss fits into base aperture 44 which aligns bottom aperture 72 with base aperture 44.

Figure 29:
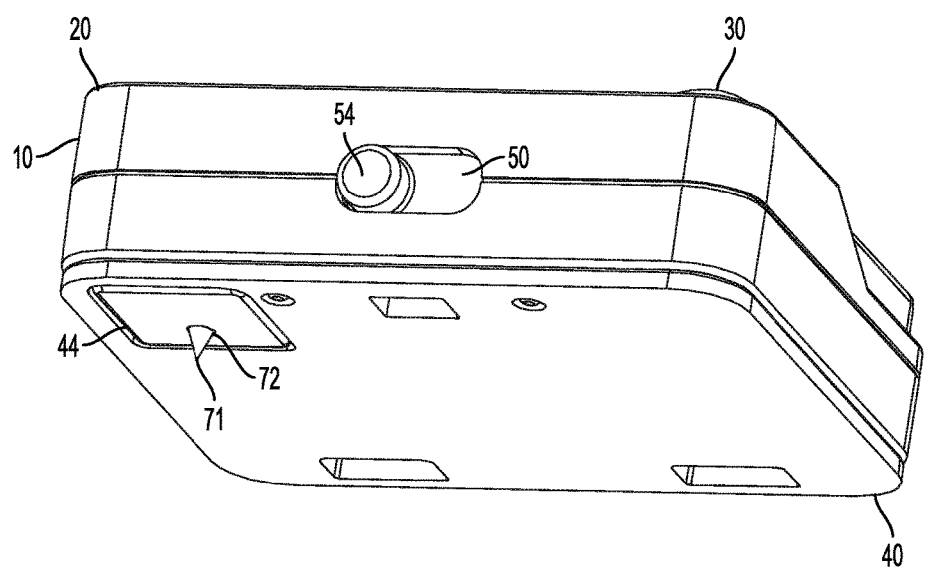
FIG. 29 is a bottom perspective view of the embodiment of an EAS device of FIG. 28 with the housing attached to the base.

FIG. 29 is a bottom perspective view of the embodiment of EAS device 10 of FIG. 28 with housing 20 attached to base 40. Latch 50 is moved to a latched position to attach housing 20 to base 40. Actuated by latch 50, wrapping splitter 71 protrudes through bottom aperture 72 and base aperture 44 in FIG. 29.

Figure 30:
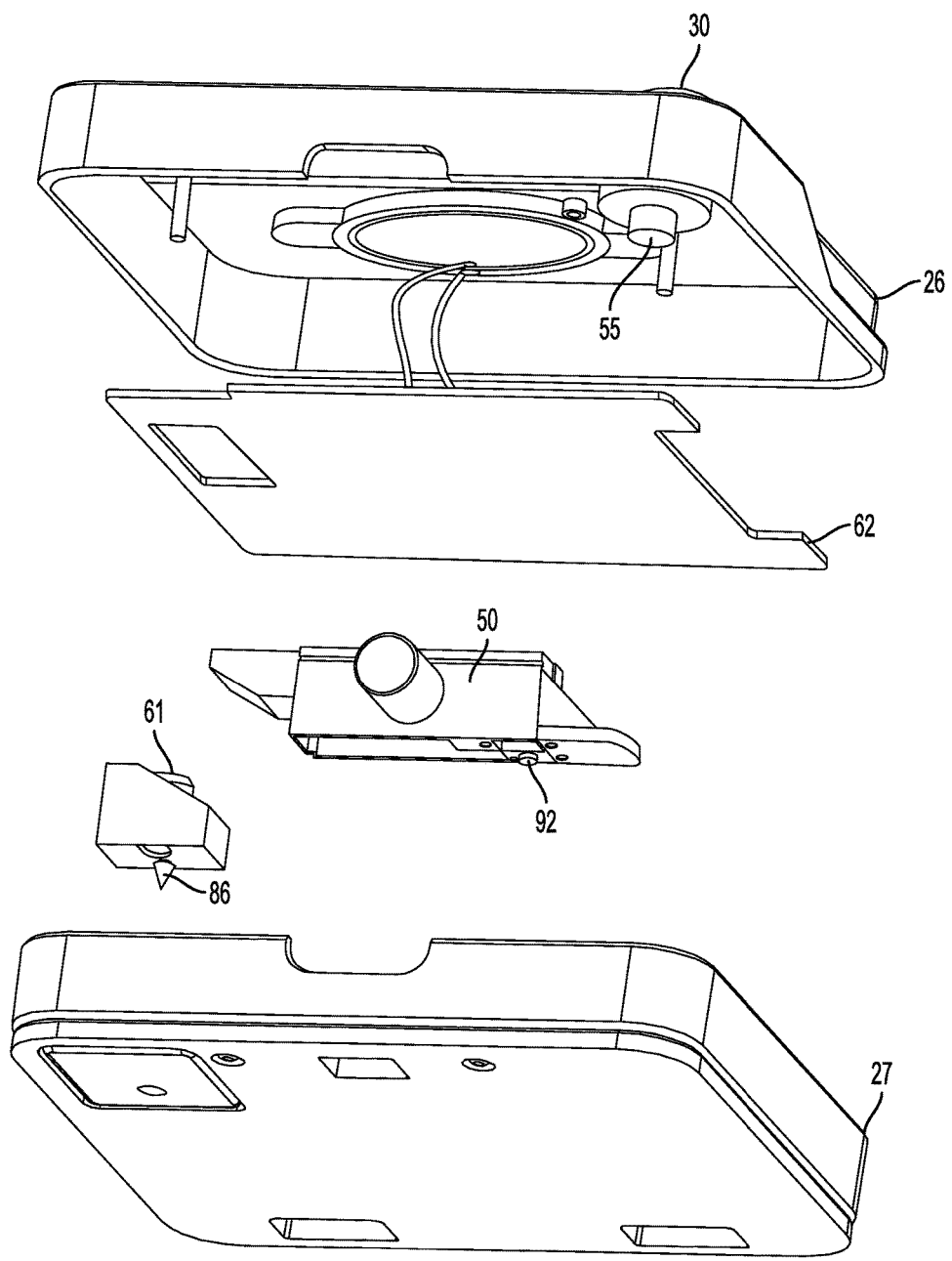
FIG. 30 is a bottom perspective view of the embodiment of FIGS. 28 and 29 with the housing attached to the base and the housing and its contents exploded.

FIG. 30 is a bottom perspective view of the embodiment of EAS device 10 of FIGS. 28 and 29 with housing 20 attached to base 40. Housing 20 and its contents are exploded. Top shell 26 is separated from bottom shell 27 which is attached to base 40. Circuit board 62 provides mounts and structure for various electronic components, while blocking pin 55, located beneath dome 30, holds latch 50 in a latched position until blocking pin 55 is moved.

In the embodiments of FIGS. 28-32, switch 61 acts as the wrapping splitter. Piercing end 86 is located on the end of plunger 85. When latch 50 is moved to a latched position, latch 50 actuates switch 61 down through bottom aperture 72 and base aperture 44, and piercing end 86 splits the wrapping on a box, or other object (See FIG. 28 with piercing end 86 extending through bottom aperture 72). In FIG. 30, switch 61 has a cam follower surface 87. Latch 50 has a cam surface 88 aligned with cam follower surface 87. As latch 50 is moved to a latched position, cam surface 88 engages cam follower surface 87 and moves switch 61 downward to extend piercing end 86 through base aperture 44. If EAS device 10 is removed from an object to which it is attached, piercing end 86 will have split the wrapping, and plunger 85 and piercing end 86 will extend through the split. This will allow switch 61 to operate and the electronics of EAS device 10 can detect the removal and generate predetermined alarms.

Figure 31:
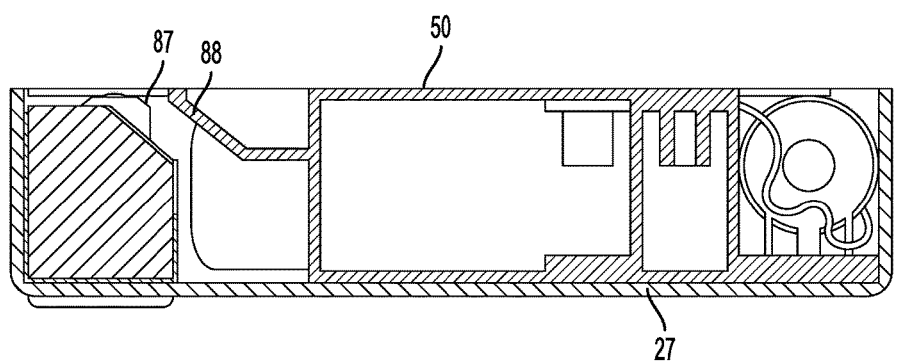
FIG. 31 is a sectioned side view of the housing of the embodiment of FIGS. 28 through 30 showing the latch in the unlatched position.
Figure 32:
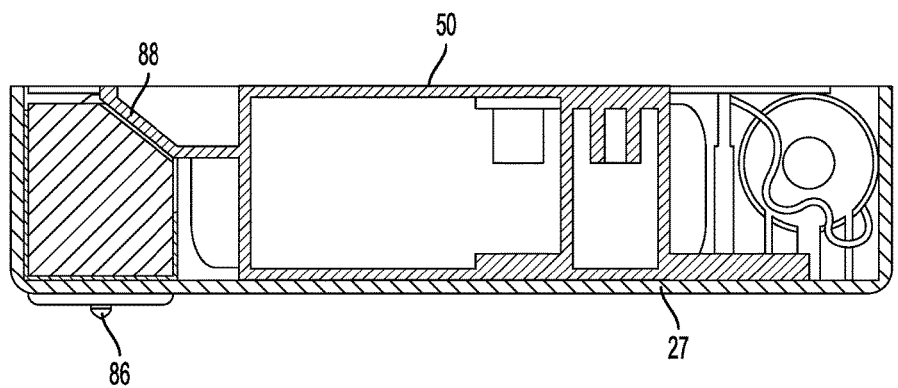
FIG. 32 is a sectioned side view of the housing of the embodiment of FIGS. 28 through 30 showing the latch in the latched position.

FIG. 31 is a sectioned side view of housing 20 of the embodiment of EAS device 10 of FIGS. 28 through 30 showing latch 50 in the unlatched position. In FIG. 31, cam surface 88 of latch 50 is positioned to align with cam follower surface 87 on switch 61. FIG. 32 is a sectioned side view of housing 20 of the embodiment of EAS device 10 of FIGS. 28 through 30 showing latch 50 in the latched position. Latch 50 has moved to the left and cam surface 88 of latch 50 has driven switch 61 downward, via contact with cam follower surface 87 on switch 61. Piercing end 86 of plunger 85 may be seen extending from the bottom of bottom shell 27 of housing 20.

Although not shown in FIGS. 31 and 32, when latch 50 is moved to a latched position, blocking pin 55 moves into position to the right of latch 50 to prevent movement of latch 50 to an unlatched position. See FIGS. 30, 7, 8, 9, 26, and 27. Blocking pin 55 is at least partially made of a magnetically attractable material. Dome 30 provides an indication of where blocking pin 55 is located. Application of a magnet to dome 30 moves blocking pin 55 away from the blocking position. This allows latch 50 to be moved to an unlatched position which allows the removal of housing 20 from base 40.

Figure 33:
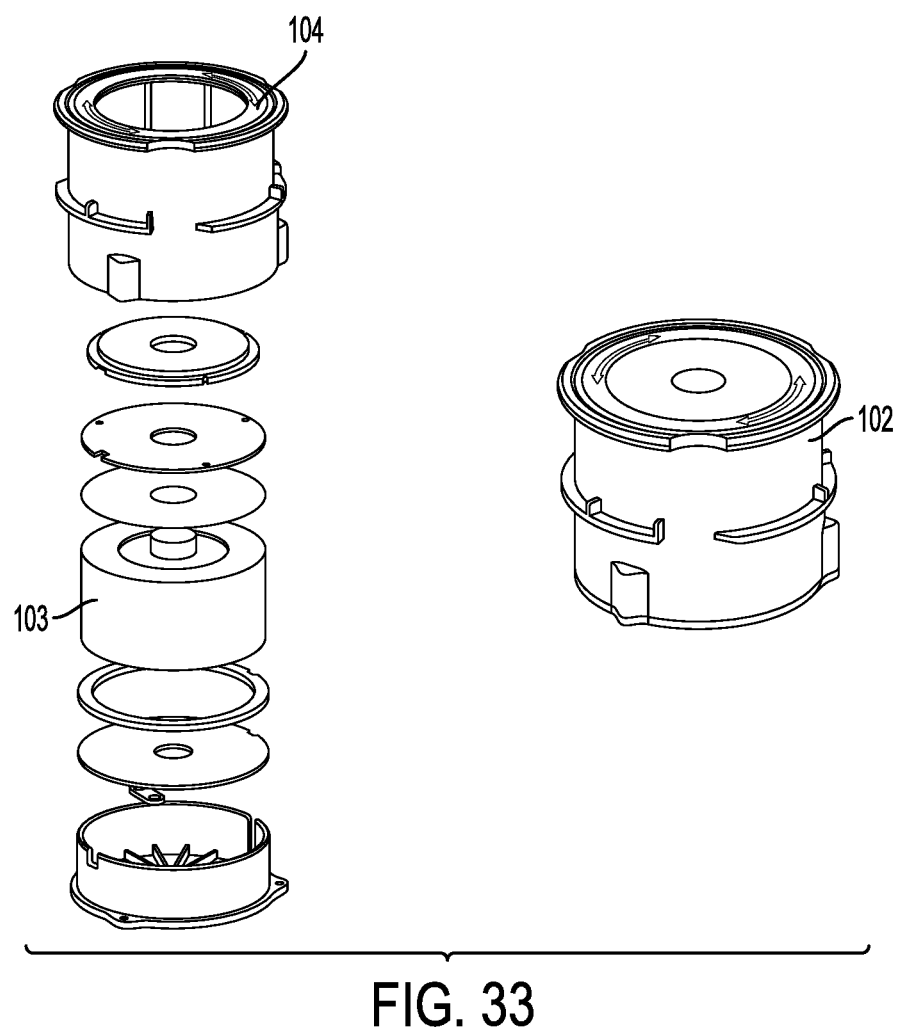
FIG. 33 shows a detacher that may be used with embodiments of the EAS device of the present invention to activate, deactivate, and detach the various embodiments.

FIG. 33 shows a hand held detacher 102 that may be used with embodiments of the EAS device 10 of the present invention to activate, deactivate, and detach the various embodiments of EAS device 10. In FIG. 33, detacher 102 is shown both assembled and exploded into components. Detacher 102 includes magnet 103 as well as some elements of handheld remote 100 described above with respect to FIG. 3. Detacher 102 also has an infrared communication port 104 or other communication elements. Hand held detacher 102 can communicate with EAS device 10 to disarm it while magnet 103 of detacher 102 is placed on EAS device 10 to actuate a release of a latching mechanism in housing 20 and release housing 20 from base 40. Alternatively to infrared communication, radio frequency communication may be used. Once the electronics 60 of housing 20 are disarmed, housing 20 may be lifted from base 40 which will change the status of installation switch 61 without electronics 60 in housing 20 generating an alarm. As described previously, some embodiments of detacher 102 and housing 20 will exchange an encrypted passcode to offer a further level of security. Additionally, some embodiments of EAS device 10 will have a clock generator and the electronics 60 will have machine readable instructions with an algorithm to alter the passcode at predetermined time intervals. The EAS system will also have at least one clock generator and have machine readable instructions with the same algorithm to continuously update the passcode synchronously with EAS device 10. Detacher 102 may be powered by a cable 105 connected to an element within the EAS system, or detacher 102 may simply be tethered to another object to prevent it from being mislaid or stolen. In some embodiments, cable 105 will provide communication capabilities between a base station 106 and EAS device 10 via detacher 102.

Figure 34:
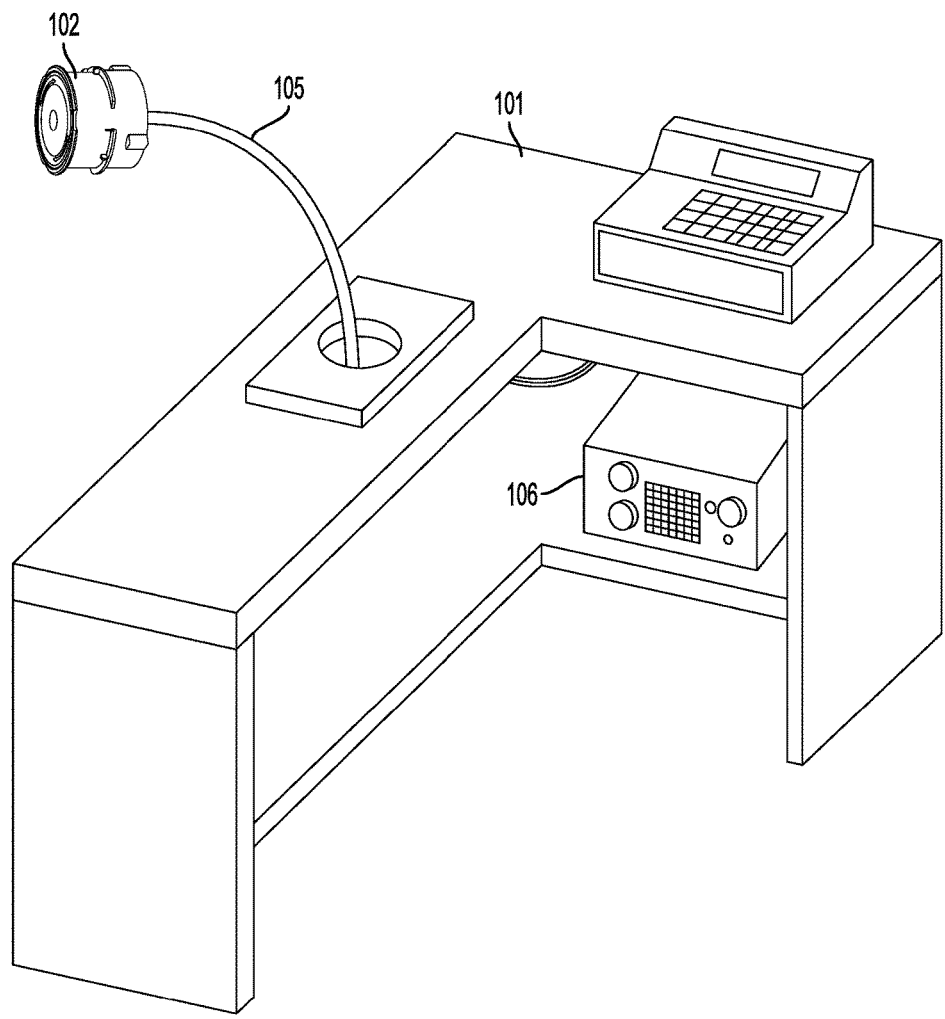
FIG. 34 shows the detacher of FIG. 33 in a retail location along with a base station.

FIG. 34 shows detacher 102 removed from its mount in a retail counter 101. In situations where the object being protected by EAS device 10 is too large to be placed on a counter, detacher 102 may be extended from its typical position to be applied to the object and detach EAS device 10. Smaller objects can be applied to detacher 102 as it is mounted in the retail counter 101.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

I claim:

1. An electronic article surveillance (EAS) apparatus for objects having wrapping, said EAS apparatus comprising:
a housing enclosing a wrapping splitter and electronic components, said housing having a bottom surface, a top surface and at least one side connecting said bottom surface and said top surface, said housing having a first attaching interface and said bottom surface having a bottom aperture, said electronic components comprising a switch having a plunger; and
a base, said base having a top surface and a bottom surface, said base having a second attaching interface complimentary to said first attaching interface, said first attaching interface and said second attaching interface facilitating the releasable attachment of said housing to said base with said bottom surface of said housing facing said top surface of said base, said base comprising a base aperture located to align with said bottom aperture in said housing when said housing is attached to said base, said base further comprising adhesive on said bottom surface of said base; wherein
said wrapping splitter extends through said bottom aperture and said base aperture when splitting the wrapping of an object to which the EAS apparatus is attached, and
when said housing is attached to said base, said plunger of said switch aligns with said bottom aperture and said base aperture and said plunger extends through said base aperture.

2. The EAS apparatus of claim 1, wherein:
said first attaching interface comprises at least one hook receiving slot in said housing and a sliding latch in said housing, said sliding latch having a latch hook mounted on it; and,
said second attaching interface comprises at least two fixed hooks on said base; wherein,
said at least one hook receiving slot receives a first of said fixed hooks on said base and said latch hook engages a second of said fixed hooks when said sliding latch is slid from an unlatched position to a latched position to maintain said housing on said base.

3. The EAS apparatus of claim 2, wherein:
said sliding latch actuates said wrapping splitter.

4. The EAS apparatus of claim 3, wherein:
said wrapping splitter comprises a pivot end and a splitting end, said pivot end being pivotally mounted within said housing proximal to said sliding latch and located to position said splitting end at said bottom aperture; and
said sliding latch comprises a splitter guide proximal to said wrapping splitter, said splitter guide moving said wrapping splitter about said pivot end when said sliding latch is slid, moving said splitting end through an arc, said splitting end of said wrapping splitter extending through said base aperture in said base to split the wrapping while moving through the arc.

5. The EAS apparatus of claim 3, further comprising:
a cantilever panel having a fixed end and a free end, said fixed end of said cantilever panel being fixed to said sliding latch; and,
a cam fixed internal to said housing, said cam located to contact said cantilever beam on said sliding latch when said sliding latch is moved;
said wrapping splitter comprising a fixed end and a splitting end, said fixed end of said wrapping splitter being fixed to said cantilever panel proximal to said free end of said cantilever panel, and said splitting end of said wrapping splitter being aligned with said bottom aperture of said housing;
said cam pushing said splitting end of said wrapping splitter through said base aperture when said sliding latch is moved.

6. The EAS apparatus of claim 3, wherein:
said wrapping splitter is said switch, said plunger comprising a piercing end and said switch further comprising a cam follower surface; and said sliding latch further comprises a cam surface aligned with the cam follower surface of said switch; wherein, when said sliding latch is slid from an unlatched position to a latched position, said cam surface contacts said cam follower surface and extends said piercing end of said plunger through said bottom aperture and said base aperture.

7. The EAS apparatus of claim 2, wherein:

said switch is fixed to said sliding latch and said sliding latch positions said switch to align with a split in the wrapping of an object.

8. The EAS apparatus of claim 2, further comprising:

a latch restrainer, said latch restrainer comprising;
- a restrainer aperture through said bottom surface of said housing, said restrainer aperture located proximal to said sliding latch within said housing;
- a restrainer pin on said sliding latch, said restrainer pin being located on said sliding latch to insert into said restrainer aperture when said sliding latch is unlatched; and,
- a release stub on said top surface of said base, said release stub positioned on said top surface of said base to insert into said restrainer aperture when said housing is placed on said base, said release stub being long enough to insert through said bottom surface of said housing; wherein,
- when said housing is placed on said base, said release stub inserts through said restrainer aperture and displaces said restrainer pin on said latch slide from said restrainer aperture, allowing said sliding latch to be moved from an unlatched position to a latched position.

9. The EAS apparatus of claim 2, further comprising:

a blocking component biased to shift position to a blocking position to block the return of said sliding latch when said sliding latch is moved to engage said latch hook into a respective fixed hook.

10. The EAS apparatus of claim 9, wherein:

said blocking component is magnetically attractable to move it from said blocking position to allow the return of said sliding latch.

11. The EAS apparatus of claim 1, wherein:

said EAS electronics further comprise a microprocessor, wireless communication elements, and a battery, said microprocessor monitoring the status of said switch.

12. The EAS apparatus of claim 11, wherein:

said wireless communication elements comprise radio frequency communication circuitry.

13. An electronic article surveillance (EAS) apparatus for objects having wrapping, said EAS apparatus comprising:

a base and a housing, said base and housing being configured to attach to each other;

said base comprising a top surface and a bottom surface, a base aperture through said base, and adhesive on said bottom surface;

said housing comprising a bottom surface, a top surface and at least one side connecting said bottom surface and said top surface, said bottom surface of said housing having a bottom aperture located to align with said base aperture when said housing is attached to said base, said housing enclosing a latch, a wrapping splitter, and electronics;

said latch being manually movable to attach said housing to said base with said bottom surface of said housing facing said top surface of said base and said bottom aperture aligning with said base aperture, said wrapping splitter aligning with, and extending through, said bottom aperture and base aperture to split the wrapping of an object to which said EAS apparatus is attached, and said electronics comprising a microprocessor, wireless communication elements, a power supply, and a switch, said switch having a plunger aligning with, and extending through, said bottom aperture and said base aperture when said housing is attached to said base, said microprocessor monitoring the status of said switch.

14. The EAS apparatus of claim 13, wherein:

said latch actuates said wrapping splitter when said latch is manually moved to attach said housing to said base.

15. The EAS apparatus of claim 14, wherein:

said wrapping splitter comprises a pivot end and a splitting end, said pivot end being pivotally mounted within said housing proximal to said latch and located to position said splitting end at said bottom aperture; and said latch comprises a splitter guide proximal to said wrapping splitter, said splitter guide moving said wrapping splitter about said pivot end when said latch is manually moved, moving said splitting end through an arc, said splitting end of said wrapping splitter extending through said base aperture in said base to split the wrapping while moving through the arc.

16. The EAS apparatus of claim 14, further comprising:

a cantilever panel having a fixed end and a free end, said fixed end of said cantilever panel being fixed to said latch; and, a cam fixed internal to said housing, said cam located to contact said cantilever beam on said latch when said latch is moved;

said wrapping splitter comprising a fixed end and a splitting end, said fixed end of said wrapping splitter being fixed to said cantilever panel proximal to said free end of said cantilever panel, and said splitting end of said wrapping splitter being aligned with said bottom aperture of said housing;

said cam pushing said splitting end of said wrapping splitter through said base aperture when said latch is moved.

17. The EAS apparatus of claim 14, wherein:

said wrapping splitter is said switch, said plunger comprising a piercing end and said switch further comprising a cam follower surface; and said latch further comprises a cam surface aligned with the cam follower surface of said switch; wherein, when said latch is manually moved to attach said housing to said base, said cam surface contacts said cam follower surface and extends said piercing end of said plunger through said bottom aperture and said base aperture.

18. The EAS apparatus of claim 13, wherein:

said switch is fixed to said latch and said latch positions said switch to align with a split in the wrapping of an object when said switch is manually moved to attach said housing to said base.

19. The EAS apparatus of claim 13, further comprising:

a latch restrainer, said latch restrainer comprising;
- a restrainer aperture through said bottom surface of said housing, said restrainer aperture located proximal to said latch within said housing;
- a restrainer pin on said latch, said restrainer pin being located on said latch to insert into said restrainer aperture when said latch is unlatched; and, a release stub on said top surface of said base, said release stub positioned on said top surface of said base to insert into said restrainer aperture when said housing is placed on said base, said release stub being long enough to insert through said bottom surface of said housing; wherein, when said housing is placed on said base, said release stub inserts through said restrainer aperture and displaces said restrainer pin on said latch from said restrainer aperture, allowing said latch to be moved from an unlatched position to a latched position.

20. The EAS apparatus of claim 13, further comprising:

a blocking component biased to shift position to a blocking position to block the return of said latch when said latch is moved to attach said housing to said base, wherein said blocking component is magnetically attractable to move it from said blocking position to allow the return of said latch.

21. The EAS apparatus of claim 13, wherein:

said wireless communication elements comprise radio frequency communication circuitry.

\* \* \* \* \*